United States Patent [19]

Masuda

[11] Patent Number: 5,009,248

[45] Date of Patent: Apr. 23, 1991

[54] FLOWMETER

[75] Inventor: Kenji Masuda, Settsu, Japan

[73] Assignee: Daikin Industries, Ltd., Osaka, Japan

[21] Appl. No.: 558,622

[22] Filed: Jul. 27, 1990

Related U.S. Application Data

[62] Division of Ser. No. 251,219, Aug. 8, 1988, Pat. No. 4,969,364.

[30] Foreign Application Priority Data

| Dec. 8, 1986 | [JP] | Japan | 61-291960 |
| Dec. 23, 1986 | [JP] | Japan | 61-310415 |
| Jan. 21, 1987 | [JP] | Japan | 62-12781 |
| Feb. 6, 1987 | [JP] | Japan | 62-26539 |
| Feb. 7, 1987 | [JP] | Japan | 62-26728 |

[51] Int. Cl.$^5$ ............................................. G05D 7/00
[52] U.S. Cl. ................................. 137/486; 73/861.72; 73/239
[58] Field of Search ............... 137/486; 73/861.72, 73/861.71, 232, 239

[56] References Cited

U.S. PATENT DOCUMENTS 4,413,648 11/1983 Walters ............................ 137/486
4,697,616 10/1987 Ashcroft ........................... 137/486

Primary Examiner—Alan Cohan

[57] ABSTRACT

In a flow meter, a detective core (5) is slidably fitted in a cylindrical chamber (3a) in a main body (2), and a fluid is introduced at a predetermined angle from inflow passageways (17) into the interior of this detective core (5), the fluid introduced into the detective core (5) being discharged at a predetermined angle to the interior of the main body (2) through outflow passageways (13). A force generated by a variation in momentum of the fluid is applied to the detective core (5), and this force is detected by a device for measuring load (6) and thereby momentarily determines a mass flow rate of the fluid. Thus, a variation in momentum is generated in the fluid by the inflow passageways (17) and outflow passageways (13), and the force produced by the momentum variation is applied to the detective core (5), the force applied to the detective core (5) being detected by the device for measuring load (6). Accordingly, the mass flow rate of a cavitation-generating fluid and a bubble-containing fluid can be measured accurately without being influenced by variations in viscosity thereof resulting from variations in temperature.

6 Claims, 9 Drawing Sheets $$F = \mathcal{S} \cdot Q (V_1 \cos\theta_1 - V_2 \cos\theta_2)$$

FLOWMETER

This application is a divisional of copending application Ser. No. 07/251,219, filed on Aug. 8, 1988, now U.S. Pat. No. 4,969,364, issued Nov. 13, 1990.

FIELD OF THE INVENTION

The present invention relates to a flowmeter which is capable of measuring the mass flow rate of a flowing fluid instantaneously, a flow control valve using said flowmeter, and a hydraulic apparatus using said flowmeter.

BACKGROUND OF THE INVENTION

FIGS. 9 and 10 represent an example of conventional flowmeters for measuring the flow rates of flowing liquids (ref. U.S. Pat. No. 3,953,819). This flowmeter 100 is composed mainly of a flange 101, housing 102, vane 103, revolving pin 105, potentiometer 106 and torsion spring 107. Said vane 103 is fixed at one edge to the revolving pin 105 in such a manner as to be able to rotate in opposition to the force of said torsion spring 107 and said revolving pin 105 is fixed to a slider in the potentiometer 106, so that electrical signals corresponding to the rotation angles of the vane 103 can be transmitted through lead wires 108. Said flowmeter 100, as shown in FIG. 10, is placed in a passageway 109 for liquids and fastened to the conduit 110 with the flange 101 bolted on and at such a position that the revolving pin 105 of the vane 103 makes right angles with the axis of said passageway 109 and that in the passageway 109 the free edge of the vane 103 meets the edge of a partition 111 which is raised from under at right angles with the axis of the passageway 109, the center of said free edge of the vane 103 coinciding with the axis of the passageway 109.

The fluid which flows through said passageway 109 causes said vane 103 to turn at an angle corresponding to the velocity of the flow. Such a flowmeter 100, therefore, is capable of measuring the volumetric flow of the fluid as a function of the angle at which the vane 103 turns.

Such a flowmeter of the conventional type measures the resistance which affects the flow as it passes the vane 103 in terms of the difference in pressures of the flowing fluid between the two sides of the vane 103 (i.e. the angle at which the vane 103 turns). Thus a conventional flowmeter is capable of measuring the flow rate in terms of volumetric value, but not the mass flow rate. Herein lies a problem in that a conventional flowmeter is unable to determine the exact flow rate where, for example, cavitation occurs or bubbles are formed in the flow. A further problem arises in that a conventional flowmeter cannot determine the current flow rate under conditions where the temperature is not stabilized, because the changes in viscosity of a fluid caused by changes in temperature influence the resistance which affects the flow.

Accordingly, it is an object of the present invention to provide a flowmeter which is designed to determine the mass flow rate by measuring changes in momentum of a flowing fluid so that measurement of a flowing fluid will not be influenced by changes in temperature and accurate measurement will be possible where cavitation, bubbling, or the like occurs in the flow.

It is another object of the present invention to provide a flow control valve which is designed to regulate the flow of a fluid by detecting changes in momentum of the flow, which are proportional to the mass flow rates, so as to be capable of adjusting a flow to a prescribed rate in terms of mass flow accurately without being influenced by changes in viscosity of the fluid or where cavitation, bubbling, or the like occurs in the flow.

It is another object of the present invention furthermore to provide a hydraulic apparatus which is designed to variably control the discharge from a variable displacement pump by detecting changes in momentum of the flowing fluid, which are proportional to the mass flow rates, so that the rate of discharge from said type of pump will be accurately controlled to a prescribed rate without being influenced by changes in viscosity of the fluid or where cavitation, bubbling, or the like occurs in the flow.

SUMMARY OF THE INVENTION

According to the present invention, a flowmeter provided as an embodiment comprises, as illustrated in FIG. 2, a main body structure 2 having a cylindrical chamber 3a interiorly formed, a detective core 5 slidably fitted in said cylindrical chamber 3a, an inflow passageway 17 bored in said main body structure 2 for leading a flowing fluid into the interior of said detective core 5, an outflow passageway 13 bored in said detective core 5 for leading into said main body structure 2 the fluid which has been led into the detective core 5 by said inflow passageway 17, wherein at least either said inflow passageway 17 or said outflow passageway 13 is so constituted to form an angle of inclination relative to the axis of said detective core 5, and, a means for measuring loads for detecting the force which acts on the detective core 5 as the flowing fluid is led into the detective core 5 by said inflow passageway 17 and then into the main body structure 2 through said outflow passageway 13.

The principle on which this invention is based will now be explained with reference to FIG. 1 hereunder.

The force F which acts on a control surface S can be reduced to a formula

F = (momentum of the fluid flowing into the control surface S) − (momentum of the fluid flowing out of the control surface S)

With $\theta_1$ as the inflow angle which the fluid makes with respect to a certain direction as it flows into the control surface S, $\theta_2$ as the outflow angle which the fluid makes with respect to said certain direction as it flows out of the control surface, $V_1$ as the velocity at which the fluid flows into the control surface S, $V_2$ as the velocity at which the fluid flows out of the control surface S, and Q as the quantity of the fluid which flows into and out of the control surface S, the above-mentioned formula regarding momentums in said certain direction of the control surface S can be developed into an equation:

$$F = \rho \cdot Q(V_1 \cos\theta_1 - V_2 \cos\theta_2) + \rho \cdot L \cdot \dot{Q} + F\tau + \alpha$$

wherein $\rho$ represents the density of the flowing fluid,

L: a damping length (a component in said certain direction of the distance between the inflow and outflow of the flowing fluid in the control surface), $\dot{Q}$: dQ/dt, Fτ: a viscous, frictional force generated between the flowing fluid and the inner surfaces within the control surface as the fluid flows past them, α: a transient force required to accelerate an object as a whole when the object, surrounded by the control surface, is moved by a force applied by the flowing fluid.

Since, ordinarily the term $(\rho \cdot L \cdot \dot{Q} + F\tau + \alpha)$ represents so small a value as to be negligible as compared with the term $\rho \cdot Q (V_1 \cos \theta_1 - V_2 \cos \theta_2)$, the above formula can be reduced to an equation $$F = \rho \cdot Q (V_1 \cos \theta_1 - V_2 \cos \theta_2) \quad (1)$$

With $A_1$ as the cross-sectional area of the inflow opening for leading the fluid into said control surface S and $A_2$ as the cross-sectional area of the outflow opening for leading the fluid out of the control surface S, and considering $V_1 = Q/A_1$ and $V_2 = -Q/A_2$, the equation (1) can be developed into an equation $$F = \rho \cdot Q \left( \frac{Q}{A1} \cos \theta_1 + \frac{Q}{A2} \cos \theta_2 \right) \quad (2)$$

which, considering $\theta_1 = \theta_2 = \theta$ and $A_1 = A_2 = A$, can further be developed into an equation $$F = 2 \cos \theta \cdot \frac{\rho}{A} \cdot Q^2$$
$$= 2 \cos \theta \cdot \frac{(\rho \cdot Q)^2}{\rho \cdot A} \quad (3)$$

Accordingly, the mass flow rate $(\rho \cdot Q)$ can be represented as a function of the force in a certain direction with $\theta$, A and $\rho$ as constants, so that a mass flow rate can be determined by measuring the force F which represents the flow rate.

According to the present invention, a flowing fluid supplied to the main body structure of a flowmeter is led at a certain inflow angle through an inflow passageway 17 bored in the main body structure and into the interior of a detective core 5, and then turned in its direction in the interior of the detective core 5 and led at a certain outflow angle through an outflow passageway 13 bored in the detective core 5 into the main body structure. A change in momentum of the flowing fluid then applies to said detecting core 5 a force, which is detected by a means for measuring loads 6 in such a manner as to measure the change in momentum of the flowing fluid, so that the mass flow rate can thus be determined. Thus a flow rate can be determined without being influenced by temperature, and a mass flow rate where bubbling, etc. occur in the flow.

As illustrated in FIG. 5, a flowmeter according to the present invention is composed of a momentum detective unit 201, a spool 238, and a pressure-detecting means; said momentum detective unit 201 comprises a main body 202 having a cylindrical chamber 203a inside, a detective core 205 slidably fitted in the cylindrical chamber 203a, inflow passageways 217 for leading flowing fluid from the main body 202 into the detective core 205, and outflow passageways 213 bored in the detective core 205 for leading the flowing fluid drawn in by the inflow passages 217 to the main body, at least either the inflow passageways 217 or the outflow passageways 213 forming a certain angle of inclination with the axis of the detective core 205; and said spool 238 is designed to switch over a passageway between an outlet port 235 and one of a plurality of inlet ports 232, 233, and conjointly with the detective core 205 forms an operative member 243 having one end 214a in a first pressure chamber 248 and the other end 239a in a second pressure chamber 240 with a piping arrangement wherein the first pressure chamber 248 is connected with either a passageway 262 or a passageway 263 by a control line 267 having a restrictor 266 therein, each of these passageways 262, 263 leading either to the inflow passageways 217 or from the outflow passageways 213 in the momentum detective unit 201, the second pressure chamber 240 is connected with either the passage 262 or the passageway 263 by another control line 270, the control line 267 on the downstream side of the restrictor 266 leads to the inlet port 232 by a line 273, and the control line 270 leads to the inlet port 233 by a line 274; said pressure-collecting means are designed to detect the pressure in the first pressure chamber 248 and that in the second pressure chamber 240 for the purpose of detecting the differential pressure between the two pressure chambers.

Flowing fluid supplied to the main body of the momentum detective unit 201 is led at a certain inflow angle through the inflow passageways 217, 217 ... in the main body into the detective core 205, then turned in its direction in the interior of the detective core 205, and led at a certain outflow angle through the outflow passageways 213, 213, ... in the detective core 205 into the main body. Then, a change in momentum of the flowing fluid applies a force to the detective core 205, thereby causing the operative member 243 to move and the spool 238 thereof to open a channel between one of the plurality of inlet ports and the outlet port 235 and the flowing fluid supplied to the inlet port by a control line is discharged from the outlet port 235 and through the restrictor 266.

A differential pressure is thereby generated between the two pressure chambers 240, 248. By detecting the differential pressure the change in momentum of the flowing fluid can be measured, hence the determination of the mass flow rate is effected. Therefore, the flow rate can be measured without being influenced by temperature and the mass flow rate can be determined where there are bubbles, etc. in the flow.

As illustrated in FIG. 6, a flow control valve according to the present invention is composed of a flow detective unit 301, a flow-regulating unit 371, and a means for setting the flow rate 361; said flow detective unit 301 comprises a main body 302 having a cylindrical chamber 303a inside, a detective core 305 slidably fitted in the cylindrical chamber 303a, a spool 338 connected with the detective core 305 and designed to open and close channels between a plurality of ports in the manner of shifting, inflow passageways 317 bored in the main body 302 for leading flowing fluid into the detective core 305, and outflow passageways 313 bored in the detective core 305 for leading the flowing fluid brought in by the inflow passageways 317 to the main body 302, at least either the inflow passageways 317 or the outflow passageways 313 forming a certain angle of inclination with the axis of the detective core 305; said flow-regulating unit 371 comprises a valve element 375 for opening and shutting the passageway leading to the inflow passageways 317 for supplying flowing fluid and a chamber 379 opened to one end of the valve element 375 and connected to one of said plurality of ports in which the pressure is controlled; said means for setting the flow rate 361 is designed to apply a set force to the detective core 305 and actuate the spool 338 so as to counterbalance the set force with a force produced by a change in momentum of the flowing fluid.

Flowing fluid supplied to the main body of the flow detective unit 301 is led at a certain inflow angle through the inflow passageways 317 in the main body into the detective core 305, then turned in its direction in the detective core 305, and led at a certain outflow angle through the outflow passageways 313 in the detective core 305 into the main body. Then, a change in momentum of the flowing fluid applies a force proportional to the mass flow to the detective core 305. The spool 338, fixed to the detective core 305, is thereby moved to a position where the force proportional to the mass flow counterbalances the force applied by the means for setting the flow rate 361 and thus a channel is opened by shifting between said plurality of ports and the pressure of the fluid in the chamber 379 opened to one end of the valve element 375 at the flow regulating unit 371 is adjusted. The pressure of the fluid in the chamber 379 causes the valve element 375 to adjust the passageway for supplying flowing fluid and thus regulates the mass flow rate of the fluid. Therefore, the mass flow rate can be regulated accurately to a predetermined rate even where cavitation, bubbling, or the like occurs in the flow.

As illustrated in FIG. 7, a flow control valve according to the present invention is composed of a flow detective unit 401, a flow-regulating unit 471, and a means for setting the mass flow rate 461; said flow detective unit 401 comprises a main body 402 having a cylindrical chamber 403a inside, a detective core 405 slidably fitted in the cylindrical chamber 403a, a spool 438 connected with the detective core 405 and designed to control the channel between an inlet port 432 and an outlet port 433, inflow passageways 417 bored in the main body 402 for leading flowing fluid into the detective core 405, and outflow passageways 413 bored in the detective core 405 for leading the flowing fluid brought in by the inflow passageways 417 to the main body 402, at least either the inflow passageways 417 or the outflow passageways 413 forming a certain angle of inclination with the axis of the detective core 405; said flow-regulating unit 471 comprises a valve element 475 for controlling the flow rate of the flowing fluid whose flow rate is detected by the flow detective unit 401 and a pilot chamber 479 which is opened to one end of the valve element 475; said means for setting the mass flow rate 461 is designed to apply a set force to the detective core 405 and actuate the spool 438 so as to counterbalance the set force with a force produced by a change in momentum of the flowing fluid and acting on the detective core 405. Said pilot chamber 479 of the flow-regulating unit 471 is connected to said outlet port 433 by a pilot line 491 having a restrictor 489; the chamber 441a opened to one end of said detective core 405 is connected by a line 494 to an intermediate point between said restrictor 489 and said outlet port 433, whereas the chamber 441b opened to the other end of said detective core 405 is connected to said pilot chamber 479 of the flow-regulating unit 471 by a line 498; the chamber 466 opened to one end of said spool 438 extending from the flow detective unit 401 is connected to said pilot line 491 by a line 496.

Flowing fluid supplied to the main body of the flow detective unit 401 is led at a certain inflow angle through the inflow passageways 417 in the main body into the detective core 405, then turned in its direction in the detective core 405, and led at a certain outflow angle through the outflow passageways 413 in the detective core 405 into the main body. Then, a change in momentum of the flowing fluid applies a force proportional to the mass flow to the detective core 405. The spool 438, connected with the detective core 405, is thereby moved to a position where the force proportional to the mass flow counterbalances the force applied by the means for setting the mass flow rate 461 and thus the channel between the inlet port 432 and the outlet port 433, hence the pressure of the fluid in the pilot chamber 479 opened to one end of the valve element 465 at the flow-regulating unit 471 as well, are controlled. The pressure of the fluid in the pilot chamber 479 causes the valve element 475 to adjust the passageway of the flowing fluid and thus regulate the mass flow rate of the fluid. Therefore, the mass flow rate can be regulated accurately to a prescribed rate even where cavitation, bubbling, or the like occurs in the flow.

The movement of the valve element 475 at the flow-regulating unit 471 causes a flow of fluid in the pilot line to change the pressure of fluid in the chamber 441a opened to one end of the detective core 405 or that in the chamber 441b opened to the other end so that the detective core 405 may receive a force opposite in direction to that which it received immediately before. Therefore, the spool 438, which is connected with the detective core 405, is restrained from acting to an excessive degree in controlling the opening for flowing fluid at the valve element 475 of the flow-regulating unit 471. Thus the mass flow rate can be promptly regulated to a prescribed value with stability in maintaining the set valve.

As illustrated in FIG. 8, a hydraulic apparatus according to the present invention is composed of a variable displacement pump 571, a flow detective unit 501 and a means for setting a mass flow rate 561; said variable displacement pump 571 has a discharge control unit 572 for variably controlling the discharge rate by pressure of fluid; said flow detective unit 501 comprises a main body 502 having a cylindrical chamber 503a inside, a detective core 505 slidably fitted in the cylindrical chamber 503a, a spool 538 acting conjoinedly with the detective core 505 and designed to control the channel between an inlet port 532 and an outlet port 533, inflow passageways 517 bored in the main body 502 for leading flowing fluid into the detective core 505, and outflow passageways 513 bored in the detective core 505 for leading the flowing fluid brought in by the inflow passageways 517 to the main body 502, at least either the inflow passageways 517 or the outflow passageways 513 forming a certain angle of inclination with the axis of the detective core 505; the means for setting the mass flow rate 561 is designed to apply a set force to the detective core 505 and actuate the spool 538 so as to counterbalance the set force with a force produced by a change in momentum of the flowing fluid and acting on the detective core 505. The pressure line 585 extended from the variable displacement pump 571 is connected to the inflow passageways 517 at the flow detective unit 501 and also to the inlet port 532 by a pilot line 588, whereas the outlet port 533 is connected to the discharge control unit 572 by a line 591.

Flowing fluid supplied to the main body of the flow detective unit 501 is led at a certain inflow angle by the inflow passageways 517 in the main body into the detective core 505, then turned in its direction in the detective core 505, and led at a certain outflow angle by the outflow passageways 513 in the detective core 505 into the main body. Then, a change in momentum of the flowing fluid applies a force proportional to the mass flow to the detective core 505. The spool 538, joined with the detective core 505, is thereby moved to a position where the force proportional to the mass flow balances the force applied by the means for setting the mass flow rate 561 and thus controls the channel between the inlet port 532 and the outlet port 533. The opening of the channel between the discharge control unit 572 of the variable displacement pump 571 and the pressure line 585 or a tank 592 that results from the above-mentioned movement of the spool 538 actuates the discharge control unit 572 in its function to variably control the discharge rate of the variable displacement pump 571. Thus, on the basis of the mass flow, the discharge rate of the variable displacement pump 571 can be controlled in accordance with a prescribed rate with accuracy even where cavitation, bubbling, or the like occurs in the flow.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

PREFERRED EMBODIMENTS OF THE INVENTION

The present invention will now be described in detail hereunder with respect to the embodiments shown by the drawings.

Figure 1:
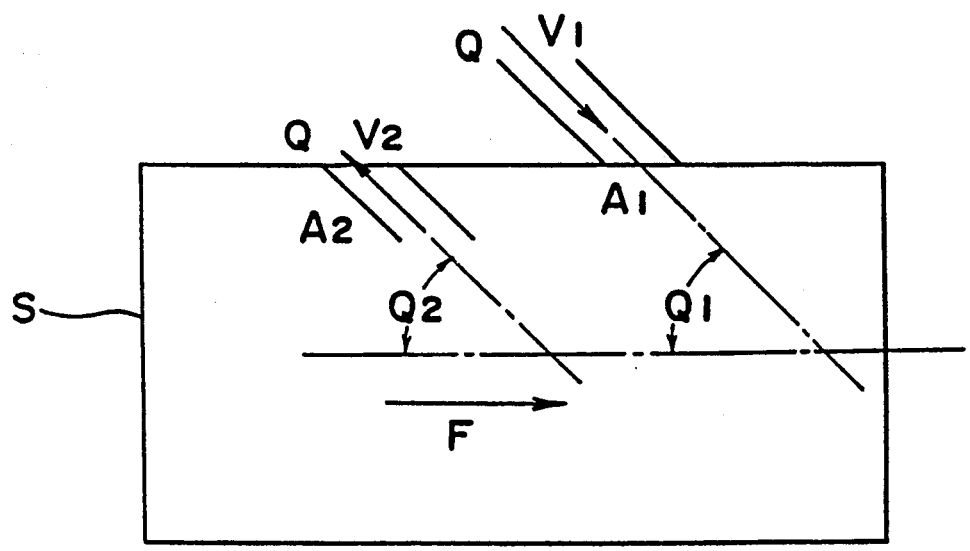
FIG. 1 diagrammatically describes the principle on which the flow rate is determined in the present invention.
Figure 2:
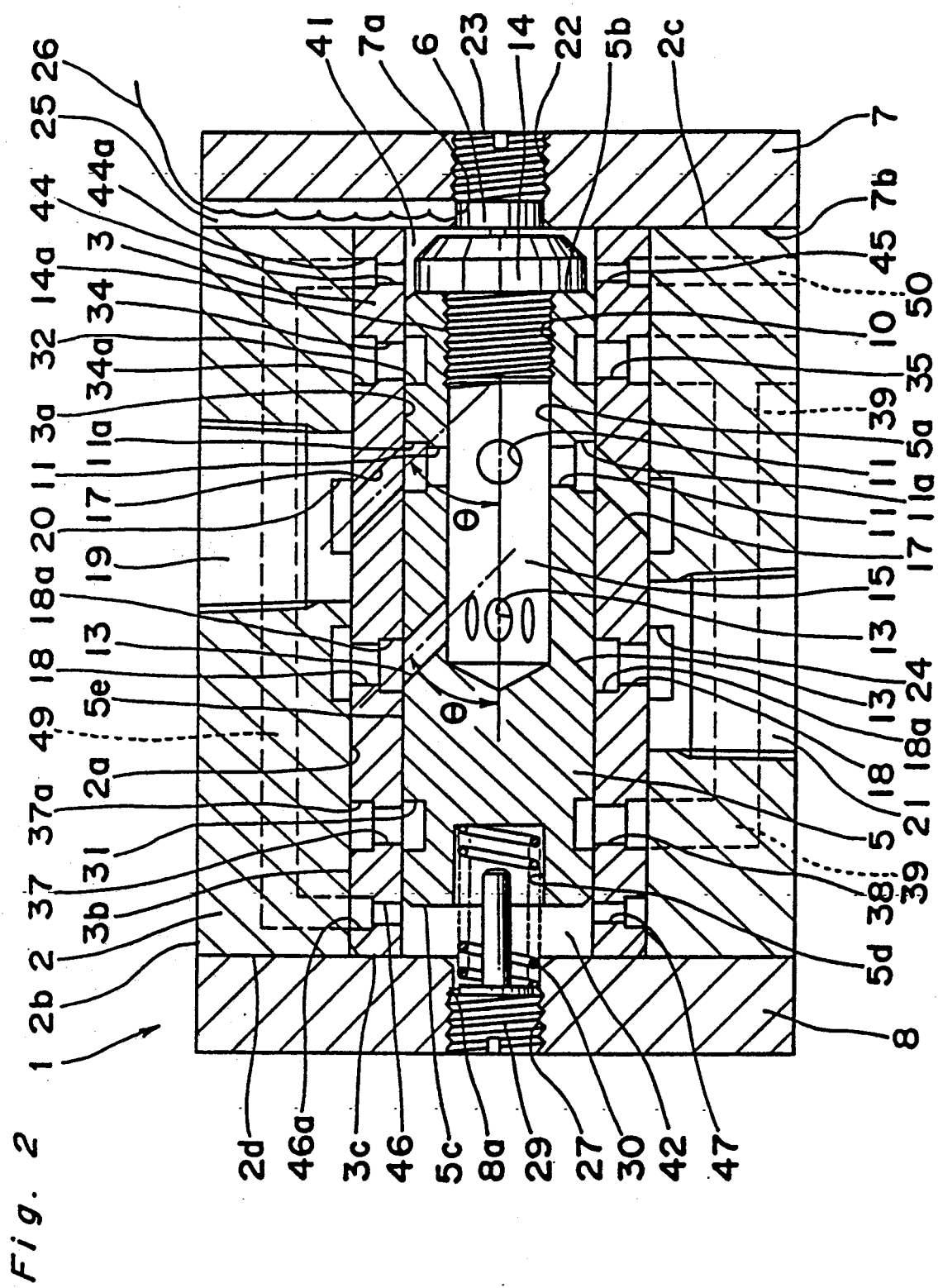
FIG. 2 is a cross-sectional view of a flowmeter as an embodiment of the present invention.

Referring to FIG. 2, a flowmeter is shown as a first embodiment, which is designed to measure the component in a certain direction of a force acting inside a control surface by means of a load cell for measuring loads (a flowmeter hereinafter described as an embodiment will be referred to as "momentum flowmeter" unless otherwise referred to).

The momentum flowmeter 1 as a first embodiment, as shown in FIG. 2, comprises in the main a main body 2 interiorly having a cylindrical bore 2a in the axial directions, a sleeve 3 fitting in the cylindrical bore 2a, a detective core 5 which is cylindrical in shape and slidably fits in the bore 3a of the sleeve 3, a load cell 6 for detecting the force acting in the axial direction of the detective core 5, and end covers 7, 8 which close the bore 3a of the sleeve 3 at both ends.

Said detective core 5 is designed to receive a force which a change in momentum of flowing liquid applies thereto. This detective core 5 has a bore 5a opened from one end 5b and coaxially along its axis and this bore 5a has an internal screw 10 formed at the open end. The detective core 5 has a bore 5d bored lengthwise from the other end 5c. The detective core 5 has four bores 11, 11, . . . opened radially from the bore 5a to the circumferential surface 5e, each bore 11 making an angle of 90° with each adjacent bore 11, and a circular groove 11a is formed in the circumferential surface 5e in such a way as to connect the four bores 11, 11, . . . The detective core 5 furthermore has eight outflow passageways 13, 13, . . . for flowing liquid bored from the circumferential surface 5e to the bore 5a at positions closer to the end 5c than are said four bores 11, 11, . . . , each outflow passageway having a cross-sectional area of A and making an angle of 45° with each adjacent outflow passageway 13 and an inclination of $\theta$ with the axis of the detective core 5.

The bore 5a of the detective core 5 is sealed with a detective core plug 14 with its screw 14a fitting in the internal screw 10, the detective core 5 thus interiorly forming a chamber 15.

Said detective core 5 is designed to receive a force which a change in momentum of flowing liquid applies thereto.

Said sleeve 3 has four inflow passageways 17, 17, . . . for the flowing liquid bored from the circumferential surface 3b to the bore 3a, each inflow passageway 17 being separated from each adjacent inflow passageway 17 at an angle of 90° and, as are so with the outflow passageways 13, having a cross-sectional area of A and making an inclination of $\theta$ with the axis of the detective core 5. The sleeve 3 furthermore has eight bores 18, 18, . . . opened radially from the bore 3a to the circumferential surface 3b at positions closer to the end 3c of the sleeve than are the inflow passageways 17, each bore 18 making an angle of 45° with each adjacent bore 18, and a circular groove 18a is formed in the inner surface 3a of the sleeve in such a way as to connect the eight bores 18, 18, . . . . The circular groove 18a and the inflow passageways 17, 17, . . . as well as the circular groove 11a and the outflow passageways 13, 13, . . . are so disposed that the distance between the center line in the circular groove 18a and the lines connecting the central points of the inflow passageways 17, both at the inner surface 3a of the sleeve 3, is equal to the distance between the center line in the circular groove 11a and the lines connecting the central points of the outflow passageways 13, both at the circumferential surface 5e of the detective core 5.

The main body 2 has at its circumferential surface 2b an inlet port 19 which leads to the inner surface 2a and is formed at such a position that its center line meets the lines connecting the central points of the inflow passageways 17, 17, ... at the circumferential surface 3b of the sleeve 3 fitting in the main body 2. The main body 2 has an outlet port 21 which leads from the inner surface 2a and is formed at such a position that its center line meets the lines connecting the central points of the bores 18, 18, ... at the circumferential surface 3b of the sleeve 3 fitting in the main body 2. The main body 2 has in its inner surface 2a a circular groove 20 whose center line shares an identical point at said inner surface 2a with the center of the inlet port 19 and which leads the flowing liquid taken in through the inlet port 19 into all of the inflow passageways 17, 17, .... Similarly, the main body 2 has a circular groove 24 which shares an identical point as the common center at the inner surface 2a with the outlet port 21 and leads to the outlet port 21 for discharging the flowing liquid discharged by all of the outflow passageways 13, 13, ....

Through said end cover 7 is bored a hole 7a with an internal screw 22 formed therein. This end cover 7 is fastened to the end 2c of the main body 2 with bolts (not shown in the drawings) and then a load cell 6 is housed in the hole 7a, and an end cover plug 23 fitting in the internal screw 22 fixes in place. In the end cover 7 is formed a groove 25 in a radial direction from the hole 7a and along the surface of the end 7b as a means for outwardly passing the lead wires 26 from the load cell 6 so that the force received by the detective device of the load cell 6 can be transmitted as a change in voltage or current.

Through said end cover 8 is bored a hole 8a with an internal screw 27 formed therein. This end cover 8 is fastened to the end 2d of the main body 2 with bolts (not shown in the drawings) and an end cover plug 29 is screwed into the internal screw 27 in the hole 8a and fixed in place. A spring 30 is placed under compression between the opposing ends of the end cover plug 29 and the bore 5d in the detective core 5. The end cover plug 23, the spring 30, and the end cover plug 29 are so disposed as to place the load cell 6 and the detective core 5 at such positions that the center of each inflow passageway 17 at the inner surface 3e of the sleeve 3 shares an identical point with the center line of the circular groove 11a at the circumferential surface 5e of the detective core 5, so that the flowing liquid entering by the inflow passageways 17, 17, ... is all led into the chamber 15.

The detective core 5 has two circular grooves 31, 32 in its circumferential surface 5e, whereas the sleeve 3 has bores 34 and 35 which lead into the circular groove 32 and furthermore in its circumferential surface 3b a circular groove 37a which connects the bores 37 and 38 and a circular groove 34a which connects the bores 34 and 35. The circular grooves 37a and 34a lead to the outside by a conduit 39 in the main body 2, so that drain produced within the momentum flowmeter 1 is collected at a drain hole through said circular grooves 31, 32, bores 38, 35, and circular grooves 37a, 34a, and through said conduit 39 in the main body 2 and refluxed into the reservoir. The sleeve 3 has bores 44 and 45 which open into the chamber 41 defined by the detective core 5, detective core plug 14, sleeve 3 and end cover 7, and in its circumferential surface 3b a circular groove 44a which connects the bores 44 and 45. The sleeve 3 also has bores 46 and 47 which open into the chamber 42 defined by the detective core 5, sleeve 3 and end cover 8, and in its circumferential surface 3b a circular groove 46a which connects the bores 46 and 47. The main body 2 has a conduit 49 which connects the circular grooves 44a and 46a, and air vent 50 by which the circular groove 44a leads into the air.

A momentum flowmeter 1, assembled as above, measures the flow rate of a flowing liquid in the following manner.

The flowing liquid drawn in by the inlet port 19 is led into the chamber 15 in the detective core 5 by the circular groove 20 in the main body 2, the four inflow passageways 17, 17, ... in the sleeve 3, and the circular groove 11a and the four bores 11, 11, ... in the detective core 5. The flowing liquid thus drawn into the chamber 15 is then led out of the flowmeter by the eight outflow passageways 13, 13, ... in the detective core 5, the circular groove 18a and the eight bores 18, 18, ... in the sleeve 3, and the circular groove 24 and the outlet port 21 in the main body 2.

In the present description the closed curved surfaces defined by the circumferential surface 5e and both the ends 5b, 5c of the detective core 5 can be considered as a control surface. Accordingly, a change in momentum that flowing liquid undergoes inside the control surface as it is led at a certain angle with the axis of the detective core 5 by inflow passageways 17, 17, ... into said region and led out of said region likewise at a certain angle by outflow passageways 13, 13, ... within said control surface is equal to the force that acts on an object (the detective core 5) positioned inside said control surface, hence the equation (2) in the foregoing description is obtained. Since in this example, as hereinbefore mentioned, the angle $\theta_1$ which the inflow passageways make is equal as $\theta$ to the angle $\theta_2$ which the outflow passageways make and the cross-sectional area A1 of the inflow passageway is equal as A to the cross-sectional area A2 of the outflow passageway, the mass flow rate of the liquid which flows into the control surface including the circumferential surface 5e and flows out of it in a stream, as will be shown by the equation (4), can be determined by measuring the force which acts on the detective core 5.

Since, as mentioned hereinbefore, the detective core 5 presses against the load cell 6 with the detective core plug 14 therebetween under the force of the spring 30, the mass flow rate of a flowing liquid passing through a momentum flowmeter 1 can be obtained by determining the force acting on the detective core 5 indicated as a change in voltage or current by the load cell 6 and by subtracting therefrom the force of said spring 30.

A momentum flowmeter 1 hereinabove described has good responsiveness since the detective core 5 presses against the load cell 6 under the force of the spring 30 so that changes in the force that acts on the detective core 5, that is to say, changes in momentum, is directly detected by the load cell 6.

Figure 3:
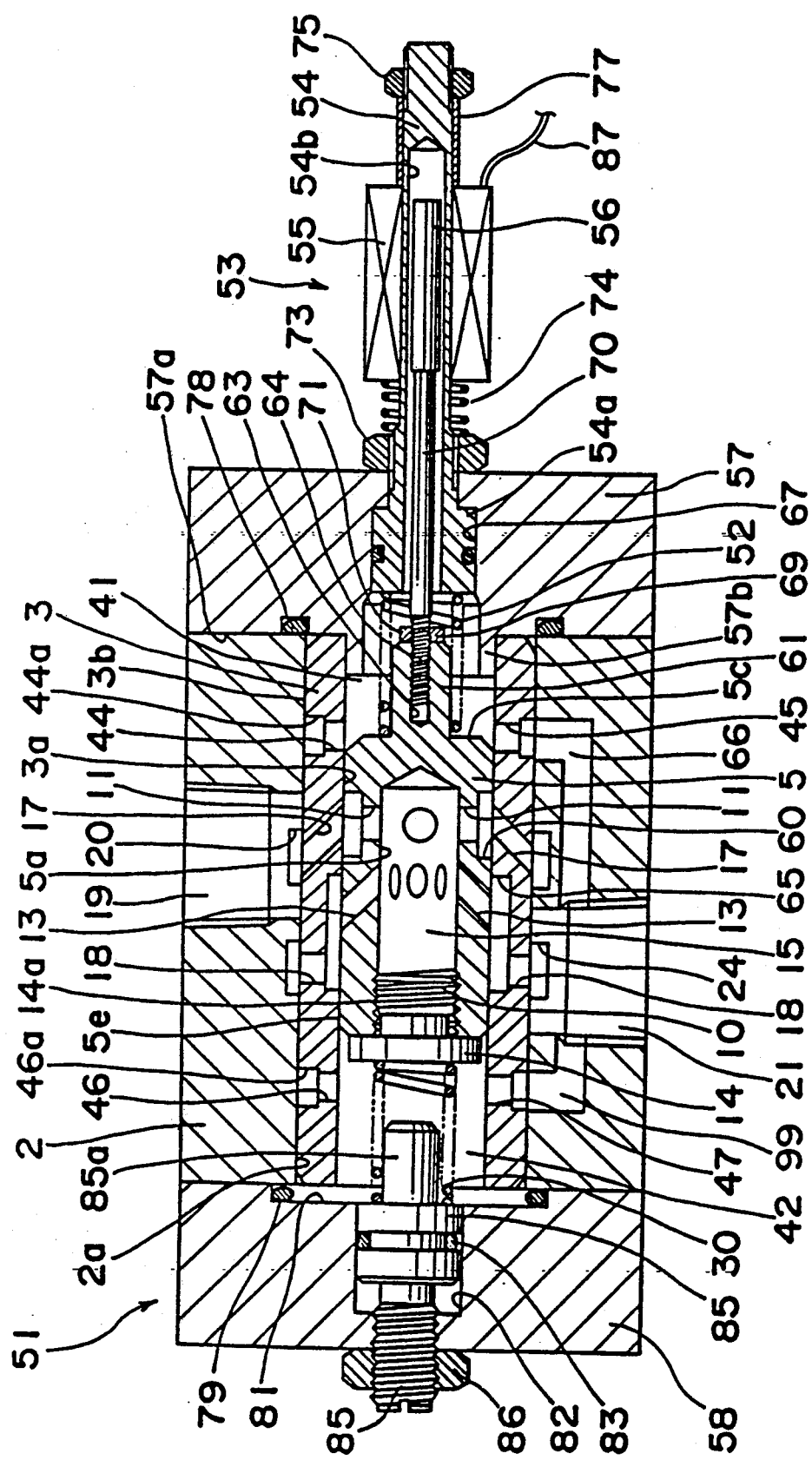
FIG. 3 is a cross-sectional view of a flowmeter representing another embodiment differing from that shown by FIG. 2.

Referring to FIG. 3, there is shown a momentum flowmeter as a second embodiment, which is designed to convert the component in a certain direction of a force acting inside a control surface to a displacement by centering springs as a part of a means for measuring loads and measure the displacement by a differential transformer as a part of the means for measuring loads. The same mechanism is in use in this second embodiment as in the first embodiment with respect to conversion of changes in momentum of flowing liquid to corresponding forces, and therefore, the parts common in structure and mechanism to both the first and second embodiments are denoted by the same numerals in FIG. 3 as in FIG. 2 and shown without explanation.

The momentum flowmeter 51 as a second embodiment, as shown in FIG. 3, comprises in the main a main body 2, a sleeve 3, a detective core 5, centering springs 30, 52, which convert a force acting on the detective core 5 to a displacement in the axial direction, a differential transformer 53 which detects the displacement electrically, and end covers 57, 58 which close the bore 3a of the sleeve 3 at both ends.

The detective core 5 has in its circumferential surface 5e a circular groove 60 which, when the detective core 5 moves in the bore 3a of the sleeve 3, is wide enough to be able to admit all the liquid flowing in by the inflow passageways 17, 17, ... into the detective core 5. The detective core 5 has in the middle of its end 5c a column-like protrusion 61, from whose end is bored a hole 63 around the axis and forms an internal screw 64 therein.

The sleeve 3 has in its inner surface 3a a circular groove 65 which, when the detective core 5 moves, is wide enough to be able to lead all the liquid flowing out by the outflow passageways 13, 13, ... into the bores 18, 18, .... In this example, each of the inflow passageways 17, 17, ... bored in the sleeve 3 has the same cross-sectional area of A and makes the same angle $\theta$ with the axis of the detective core 5 as each of the outflow passageways 13, 13, ... bored in the detective core 5.

The main body 2 has therein a conduit 99 which leads from a an circular groove 46a to a outlet port 21 and a conduit 66 which leads from the circular groove 44a to the outlet port 21, so that drain produced within the momentum flowmeter 51 is led to the outlet port 21 by bores 44, 45, 46, 47, circular grooves 44a, 46a, and conduits 66, 99.

Said differential transformer 53 consists of a cartridge 54, a coil 55, a movable iron core 56, etc. This movable iron core 56 is fixed to one end of a rod 70 which has an external screw 69 formed at the other end. The external screw 69 fitting in the internal screw 64 in the detective core 5, the rod 70 is coaxially screwed into the detective core 5 and fixed thereto with a nut 71.

Said end cover 57 has around its center a circular edge 57b which projects from the side 57a brought into contact with the main body 2 and the end cover 57 has a stepped hole 67 consisting of three steps bored in the axial direction in the middle of the end cover 57. Into the intermediate step of this stepped hole 67 is fitted the end 54a of the cartridge 54 of the differential transformer 53 and fixed thereto with a nut 73. The cartridge 54 thus fixed to the end cover 57 is loaded with said rod 70 with the movable iron core 56 through the bore 54b axially formed therein, and the end cover 57 is fixed by bolting (not shown in the drawing) to the main body 2, with the circular edge 57b fitted into the bore 3a of the sleeve 3 so as to coaxially align the movable iron core 56 with the detective core 5, and sealed with an O-ring 78. Said coil 55 of the differential transformer 53 is slidably mounted on the cartridge 54, pressed outwardly under the force of the spring 74 compressed between the nut 73 and the coil 55, and held in place by a nut 75 at the outermost end of the cartridge 54 with a collar 77 therebetween. By turning the nut 75, therefore, the coil 55 can be moved in the axial direction on the cartridge 54, so that the position of the coil 55 relative to that of the movable iron core 56 can be adjusted to an optimal point.

Said end cover 58 has on its inward side a bore 81 where an O-ring 79 is fitted in, and in the middle a stepped hole 82 bored therethrough around the axis. In the stepped hole 82 are fitted an O-ring 83 at an intermediate position and an end cover plug 85 which has a projection 85a extending into the chamber 42 open to the detective core plug 14, the end cover plug 85 being fixed thereto with a nut 86. The end cover 58 is fixed to the main body 2 by bolting (not shown in the drawing).

Centering springs 30 and 52 are fitted in under compression between the end cover plug 85 and the detective core plug 14 and between the detective core 5 and the end 54a of the cartridge 54 so as to hold the detective core 5 at an intermediate position in the sleeve 3, so that by turning the end cover plug 85 the detective core 5 can be moved in the axial direction and its position relative to the sleeve 3 can be adjusted to an optimal point.

A momentum flowmeter 51, assembled as above, measures the flow rate of a flowing liquid in the following manner.

In the same manner as in the description of the first embodiment, the flowing liquid drawn in by the inlet port 19 is led into the chamber 15 in the detective core 5 by the inflow passageways 17, 17, ..., etc., and led out of the flowmeter by the outflow passageways 13, 13, ..., etc. and the outlet port 21. As is so with the first embodiment, therefore, the mass flow rate of a flowing liquid passing through the momentum flowmeter 51 can be determined by measuring the force which acts on an object enveloped by a control surface including the circumferential surface 5e of the detective core 5, that is to say, the detective core 5.

Since, as mentioned hereinbefore, the detective core 5 is held at an intermediate position in the sleeve 3 under the forces of the centering springs 30 and 52 so as to make the center of the mouth of each inflow passageway 17 share an identical point with the center line of the circular groove 60, the detective core 5, as it receives a force from the flow of liquid, undergoes a displacement accordingly against the force of the centering spring 30 or 52. This displacement of the detective core 5 appears as a displacement of the movable iron core 56 of the differential transformer 51, which is received as electrical signals through the lead wire 87. If the displacement of the detective core 5, electrically determined by the differential transformer 53, is expressed as x and the spring constants of the centering springs 30 and 52 as $k_1$ and $k_2$ respectively, the force $F_1$ which the spring 30 receives from the displacement x of the detective core 5 can be expressed as $F_1 = k_1 x$, and likewise, the force $F_2$ which the spring 52 receives as $F_2 = k_2 x$, hence the force F which the detective core 5 receives can be expressed as $$F = F_1 + F_2 = (k_1 + k_2)x$$

In this example, therefore, the mass flow rate can be determined by finding the displacement x of the detective core 5.

In the embodiment the chambers 41, 42, which are open to the respective ends of the detective core 5, are connected to the outlet port 21, so that no seal for stopping pressurized liquid is required at the circumferential surface 5e of the detective core 5 and the phenomenon called hydraulic lock does not occur even after a long time of use. The same effect can be achieved by passing the conduits 66, 99 from the two chambers 41, 42 to the inlet port 19 instead of the outlet port.

Both in the first embodiment and in the second embodiment above a series of passageways comprising a circular groove 11a or 60, bores 11, chamber 15, and outflow passageways 13 are bored in the detective core 5. The effect of the present invention, however, can be achieved where a stream of liquid flows in at a certain angle with a control surface including the circumferential surface 5e of the detective core 5 and flows out of the control surface at a certain angle. Therefore, it is not essential to form the passageways for flowing liquid in the detective core 5 in accordance with the illustration in FIG. 3.

Figure 4:
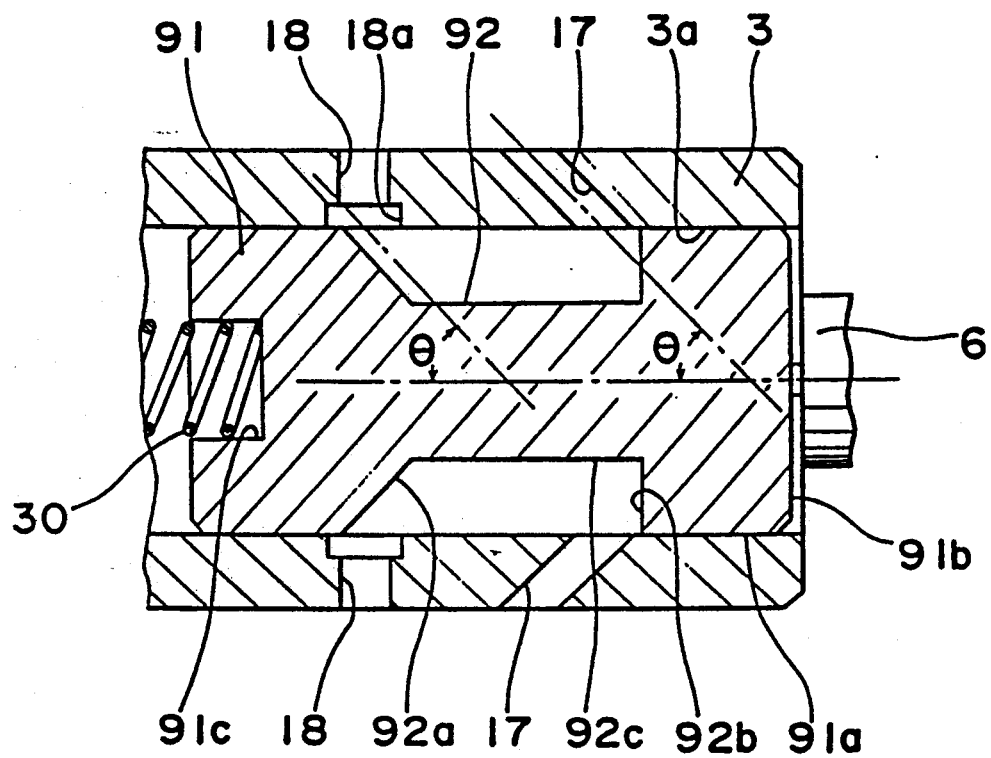
FIG. 4 is a cross-sectional view of a key fragment of a flowmeter as another embodiment differing from those shown by FIGS. 2 and 3.

Referring to FIG. 4, there is shown an essential part of a third embodiment of the present invention in a cross-sectional representation. This third embodiment exemplifies cases where no passageways for flowing liquid are formed in the interior of the detective core 91. In FIG. 4, the parts common in structure and mechanism to those in FIGS. 2 and 3 are denoted by the same common numerals and shown without explanation. Illustrations are also omitted, apart from the detective core, sleeve, spring, and means for measuring loads each of which constitutes a key part in the third embodiment.

The detective core 91 has in its circumferential surface 91a a circular groove 92 in the middle, one sidewall 92a of which inclines at the same angle of $\theta$ to the axis of the detective core 91 as the inflow angle $\theta$ at which inflow passageways 17, 17, . . . are bored in the sleeve 3. The opening by which liquid flows into the a control surface including the circumferential surface 91a of the detective core 91 has the same area of A as the opening by which the liquid flows out of the control surface. The circumferential surface of the detective core 91 that defines the control surface is the cylindrical surface (virtually the inner surface 3a of the sleeve 3) which includes the surfaces 91a, 91a of the detective core 91 that are in contact with the inner surface 3a of the sleeve 3 but does not include the surfaces 92a, 92b, 92c of the detective core 91. The sides 92b, 92c of the circular groove 92 can be formed in any shape, provided that the liquid flowing in by the inflow passageways 17, 17, . . . can be completely drawn into the control surface including the circumferential surface 91a of the detective core 91 and let out of the control surface at an outflow angle of $\theta$ along the sidewall 92a.

The end 91b of the detective core 91, as in the first embodiment, is made to press under the force of a spring 30 against the detective device of a load cell 6, a means for measuring loads, for detecting the force which the flowing liquid applies to the detective core 91. The means for measuring loads, instead, may be one which, as in the second embodiment, translates forces into displacements for measurement.

In each of the first, second and third embodiments hereinbefore described, a sleeve 3 wherein the inflow passageways 17, 17, . . . and circular groove 18a or 65, bores 18, etc. for letting out the liquid are formed is interposed between the main body 2 and the detective core 5 or 91. The present invention does not restrict its application to this particular construction but has within its scope and spirit such construction wherein the main body 2 itself has the inflow passageways 17, 17, . . . , circular groove 18a or 65, etc. so as to dispense with a sleeve 3. Nor does the present invention restrict its application to introduction of the same angle for the inflow angle $\theta_1$ at which liquid flows into a control surface including the circumferential surface 5e or 91a of the detective core 5 or 91 and for the outflow angle $\theta_2$ at which the liquid flows out of the control surface, nor to introduction of the same value for the sectional area $A_1$ of the mouth by which liquid flows in and for the sectional area $A_2$ of the exit, as against the introduction of the same angle $\theta$ and the same sectional area A in each of the three embodiments hereinbefore described. In the case of $\theta_1 \neq \theta_2$ or $A_1 \neq A_2$, however, it is essential that the mass flow rate be determined by the formula (2).

As a means for measuring loads by which the forces which the detective core 5 or 91 receives are detected a load cell 6 or combination of a differential transformer 53 and centering springs 30, 52 is in use in the embodiments hereinbefore described. Nevertheless, other alternatives for the same purpose can be used in the practice of the present invention.

As hereinbefore described, an embodiment of the present invention is designed to measure the force which results from a change in momentum of the flowing liquid and acts on the object positioned inside the control surface so that it is capable of determining the mass flow rate of a flowing liquid without being influenced by changes in viscosity of the liquid which result from changes in temperature, and is thus enabled to determine the flow rate where cavitation, bubbling, or the like occurs in the flow.

An embodiment of the present invention may consist of a cylindrical main body in whose interior is slidably fitted a detective core, and have in said main body inflow passageways for leading into the circumferential surface defined by the detective core flowing liquid at a certain inflow angle to the axis of the detective core and in said detective core outflow passageways for leading out of said circumferential surface into the main body at a certain outflow angle to the axis of the detective core the flowing liquid drawn into the circumferential surface of the detective core so that the forces which result from the changes in momentum of the flowing liquid as it flows into and out of said circumferential surface act on the detective core.

A change in momentum of the flowing liquid can therefore be evaluated in terms of a force acting on the detective core by a means for measuring loads provided to the detective core for the detection of the force, hence the mass flow rate of a flowing liquid can be determined on the basis of changes in momentum of the flow.

The present invention, therefore, makes it possible to accurately determine the mass flow rate of a flowing liquid without being influenced by changes in viscosity of the liquid caused by changes in temperature or where cavitation, bubbling, or the like occurs in the flow. Another advantage of a flowmeter embodying the present invention is its compactness which permits it to be incorporated as a part into a different hydraulic apparatus in a simple manner.

Figure 5:
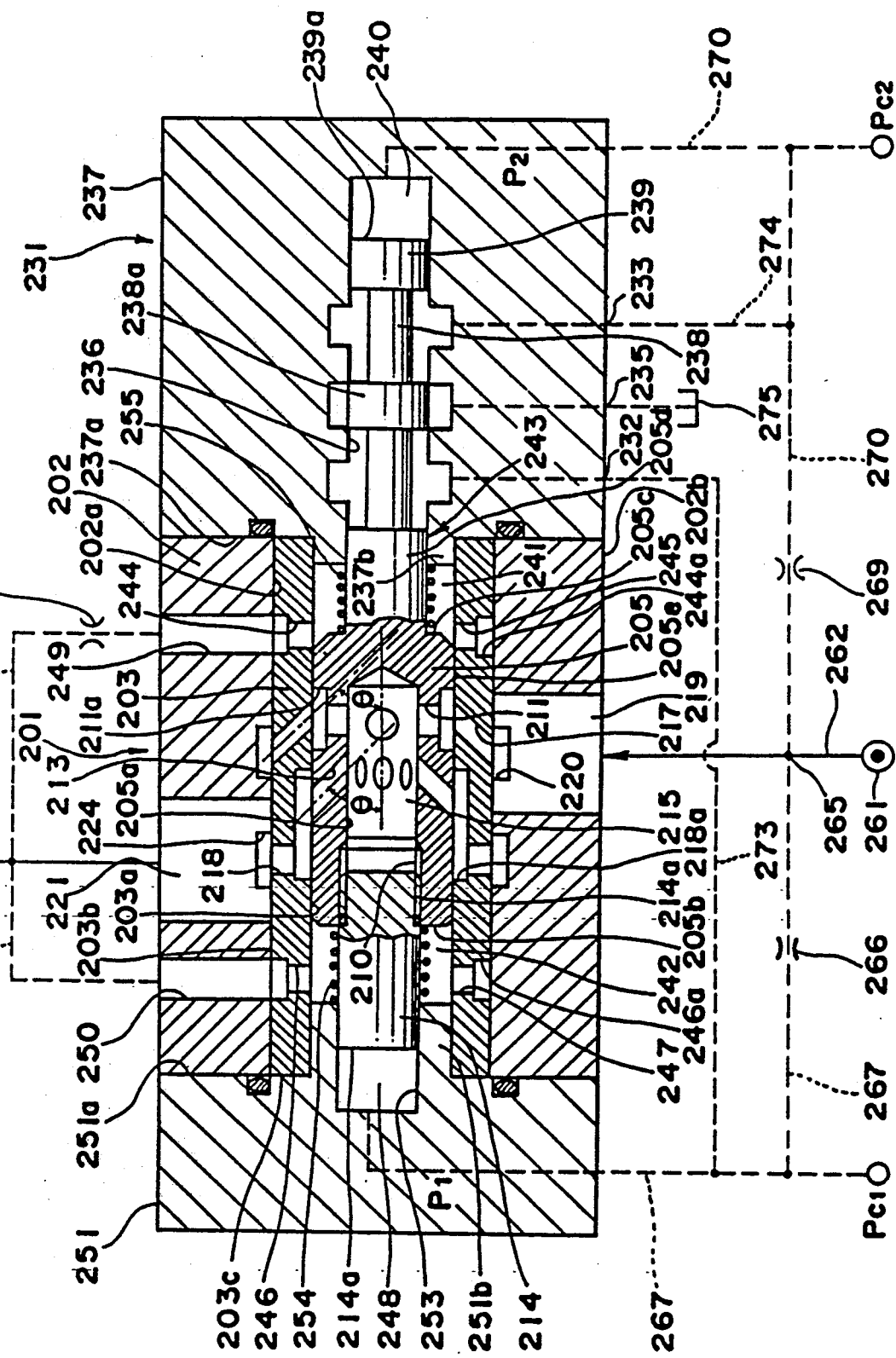
FIG. 5 is a cross-sectional view of a flowmeter representing another embodiment differing from those shown by FIGS. 2 through 4.

Referring to FIG. 5, there is shown a flowmeter as a fourth embodiment (hereinafter referred to as "momentum flow detector") in a longitudinal cutaway which consists primarily of a momentum detective unit 201 and a control valve 231.

Said momentum detective unit 201 comprises in the main a main body 202 having a cylindrical bore 202a in the axial direction, a sleeve 203 fitting in said cylindrical bore 202a, and a detective core 205 which is cylindrical in shape and fits slidably in a bore 203a internally formed in said sleeve 203.

Said detective core 205 is designed to receive a force which a change in momentum of flowing liquid applies thereto. In the detective core 205 is formed a bore 205a in the axial direction from the end 205b which is at the left in the drawing and an internal screw 210 is formed at the entry into the bore 205a. A detective core plug 214 having an external screw 214a formed at one end is fitted into the internal screw 210 in the manner of sealing the bore 205a so that a chamber 215 is interiorly formed in the detective core 205. The detective core 205 has four bores 211, 211, ... opened radially from the bore 205a to the circumferential surface 205e, each bore 211 making an angle of 90 with each adjacent bore 211, and the detective core 205 has in its circumferential surface 205e a circular groove 211a which, when the detective core 205 moves in the bore 203a of the sleeve 203, is wide enough to be able to lead all the liquid flowing in into the bores 211, 211, ... The detective core 205 furthermore has eight outflow passageways 213, 213, ... bored from the circumferential surface 205e to the bore 205a at positions closer to the end 205b than are the bores 211, each outflow passageway 213 making an angle of 45 with each adjacent outflow passageway 213 and an inclination of $\theta$ with the axis of the detective core 205.

Said sleeve 203 has four inflow passageways 217, 217, ... bored from the circumferential surface 203b to the bore 203a. Each of these inflow passageways 217 is separated from each adjacent inflow passageway 217 at an angle of 90, has the same cross-sectional area as each outflow passageway, and makes an inclination of $\theta$ with the axis of the detective core 205, as do the outflow passageways. The sleeve 203 furthermore has eight bores 218, 218, ... opened radially from the bore 203a to the circumferential surface 203b at positions closer to the end 203c at the left of the sleeve 203 in the drawing than are the inflow passageways 217, each bore 218 making an angle of 45 with each adjacent bore 218, and in its inner surface 203a a circular groove 218a which, when the detective core 205 moves, is wide enough to be able to lead all the liquid flowing out by the outflow passageways 213, 213, ... into the bores 218, 218, ....

Said main body 202 has at one side 202b (the lower side in the drawing) an inflow port 219 which is connected to the inflow passageways 217, 217, ... in the sleeve 203 at all times, and at the upper side in the drawing an outflow port 221 which is connected to the bores 218, 218, ... in the sleeve 203 at all times. The main body 202 has in its inner surface 202a a circular groove 220 which connects the inflow port 219 with the inflow passageways 217, 217, ... at all times so that flowing liquid drawn in by the inflow port 219 can be led into all of the inflow passageways 217, 217, ..., and also a circular groove 224 which connects the bores 218, 218, ... in the sleeve 203 with the outflow port 221 at all times so that the liquid flowing out by the outflow passageways 213, 213, ... can all be discharged by the outflow port 221.

Said control valve 231 comprises a housing 237, a valve chamber 236, which is cylindrical in shape, open at one end, and formed around the center in said housing 237, and in which are formed passageways between a first inlet port 232, a second inlet port 233 and an outlet port 235, and a spool 238 slidably fitted in the valve chamber 236 which controls the passageways between the outlet port 235 and the first inlet port 232 and between the outlet port 235 and the second inlet port 233 in the valve chamber 236 by means of a land 238a. One end of the spool 238 is provided with a land 239, which forms a second pressure chamber 240 defined by the end surface 239a of the land 239 and interior walls of said housing 237. The spool 238 is fixed coaxially to the detective core 205 by joining the other end of the spool 238 to a column-like projection 205d projected from the end 205c of the detective core 205 so that said detective core plug 214, detective core 205, and spool 238 are combined to form a unified operative member 243. Said housing 237, whose end surface 237a having an opening into the valve chamber 236 has a circular edge 237b projected therefrom, is joined to the main body 202 by fitting the circular edge 237b into the bore 203a of the sleeve 203 and also by fitting the column-like projection 205d projected from the detective core 205 into said opening into the valve chamber 236 internally defined by said circular edge 237b, and fastened together by bolting and the like (not shown in the drawing).

The end cover 251 (shown at the left in the drawing), whose inward side 251a has a cylindrical projection 251b, is joined to the main body 202 by fitting the cylindrical projection 251b into the bore 203a of the sleeve 203 and also by slidably fitting the detective core plug 214 fixed to the detective core 205 into the bore 253 axially defined internally by said cylindrical projection 251b, and fastened together by bolting and like (not shown in the drawing). A first pressure chamber 248 is thereby formed, defined by the end surface 214a of the detective core plug 214 and the bore in the inward side of the end cover 251.

A first spring 254 is set under compression between the edge of the cylindrical projection 251b of said end cover 251 and the end 205b (at the left in the drawing) of the detective core 205, and a second spring 255 is set under compression between the circular edge 237b projected from said housing 237 and the end 205c opposed thereto (at the right in the drawing) of the detective core 205 so that, when the momentum detective unit 201 is not in operation, the detective core 205 is placed at the neutral position under the counterbalancing forces of the first spring 254 and the second spring 255 and then each bore 211 in the detective core 205 confronts to the mouth of each corresponding inflow passageway 217.

Said sleeve 203 has bores 244 and 245 each of which is open into the chamber 241 (at the right in the drawing) defined by the detective core 205, column-like projection 205d projected from the detective core 205, sleeve 203, and housing 237, and in its circumferential surface 203b of the sleeve 203 a circular groove 244a which is connected with the bores 244 and 245. The sleeve 203 furthermore has bores 246 and 247 each of which is open into the chamber 242 (at the left in the drawing) defined by the detective core 205, sleeve 203, end cover 251, and detective core plug 214, and in its circumferential surface 203b of the sleeve 203 a circular groove 246a which is connected with the bores 246 and 247. The main body 202 has a bore 249 which is connected with the circular groove 244a and a bore 250 which is connected with the circular groove 246a.

This momentum flow detector is connected with a pressure source 261 as follows. The pressure source 261 is connected to said inflow port 219 in the momentum detective unit 201 by a passageway 262, and a passageway 263 is connected with the outflow port 221. A first control line 267 having a first restrictor 266 connects said first pressure chamber 248 with a junction 265 provided to said passageway 262 and a second control line 270 having a second restrictor 269 connects said second pressure chamber 240 with the junction 265. The first control line 267 on the downstream side of the first restrictor 266 is also connected to the first inlet port 232 of said control valve 231 by a line 273 and the second control line 270 on the downstream side of the second restrictor 269 is also connected to the second inlet port 233 by a line 274, and the outlet port 235 is connected to a tank 275.

Said bore 249 in the main body 202 is connected to said passageway 263 by a line 278 having a restrictor 276 and likewise said bore 250 to the passageway 263 by a line 279 so that drain produced in the chamber 241 or 242 in the momentum detective unit 201 is led into the passageway 263, the drain in the chamber 241 by the bores 244, 245, circular groove 244a, bore 249, and line 278 and that in the chamber 242 by the bores 246, 247, circular groove 246a, bore 250, and line 279. The lines 278, 279 may also connect the bores 249, 250 respectively to the passageway 262 instead.

A momentum flow detector assembled as above is designed to convert a change in momentum of flowing liquid into a force by means of the detective core 205 and actuate the spool 238 of the control valve 231 by such a force so that by controlling the pressures $P_1$ and $P_2$ of the liquid acting on the respective ends 241a and 239a of the operative member 243 the change in momentum of the flowing liquid can be detected as a differential pressure between the pressures $P_1$ and $P_2$. The momentum flow detector operates as follows.

A flowing liquid supplied by the pressure source 261 is led into the momentum flow detector by the passageway 262 and inflow port 219 and flows into the chamber 215 in the detective core 205 by the circular groove 220 in the main body 202, the four inflow passageways 217, 217, ... in the sleeve 203, the circular groove 211a and four bores 211, 211, ... in the detective core 205. The liquid led into the chamber 215 is led out by the eight outflow passageway 213, 213, ... in the detective core 205, the circular groove 218a and eight bores 218, 218, ... in the sleeve 203, and the circular groove 224 in the main body 202 and discharged by the outflow port 221.

Since the closed curved surface defined by the circumferential surface 205e and both the ends 205b, 205c of the detective core 205 can be considered as a control surface, a change in the momentum which flowing liquid undergoes inside the control surface as it is led into the control surface at a certain angle to the axis of the detective core 205 by the inflow passageways 217, 217, ... and led out at a certain angle by the outflow passageways 213, 213, ... positioned inside the control surface is equal to the force that acts on the object (the detective core 205 in this example) inside the control surfaces, hence the formula (3) hereinbefore mentioned is obtained. As mentioned already, since, in this example, the angle $\theta_1$ which each inflow passageway 217 makes is equal ($=\theta$) to the angle $\theta_2$ which each outflow passageway 213 makes and the sectional area $A_1$ of the inflow opening is equal ($=A$) to the sectional area $A_2$ of the outflow opening, the mass flow rate of flowing liquid which flows into the control surface including the circumferential surface 205e and flows out of it can be determined by detecting the force acting on the detective core 205, as shown by the formula (3). The circumferential surface of the detective core 205 that defines the port of the control surface is the cylindrical surface (corresponding to the inner surface 203a of the sleeve 203) including the surfaces 205e, 205e, ... of the detective core 205 which are in contact with the inner surface 203a of the sleeve 203.

The detective core 205 is placed at such an intermediate position in the sleeve 203 under the forces of the first spring 254 and the second spring 255, as described already, that the center of the opening of each inflow passageway 217 shares an identical point with the center line of the circular groove 211a. A displacement of the detective core 205 occurs accordingly, as it receives a force which the flow of liquid applies thereto, counteracting the force of either the first spring 254 or the second spring 255 and causing the detective core plug 214, detective core 205, and spool 238 all combined in one operative member 243 to move in the bore 253, bore 203a of the sleeve 203, and valve chamber 236 respectively.

Said first control line 267 having the restrictor 266 supplied with the liquid from the pressure source 261 conveys a part of it to the first pressure chamber 248 and another part to the first inlet port 232 by the line 273, whereas said second control line 270 supplied likewise with the liquid from the pressure source 261 conveys a part of it to the second pressure chamber 240 and another part to the second inlet port 233 by the line 274. Branching off from the same junction 265 of the passageway 262, the first control line 267 and the second control line 270 apply the same pressure P to the first pressure chamber 248 and the second pressure chamber 240 respectively.

When a force F acts on the detective core 205 of the operative member 243, causing this operative member to be moved, for example, to the right in the drawing, the land 238a of the spool 238 begins to open a passageway between the first inlet port 232 and the outlet port 235 as the displacement occurs so that the liquid supplied through the line 273 is discharged into the tank 275. Then, the pressure of the liquid supplied to the first pressure chamber 248 begins to drop to $P_1$, in keeping with a drop in pressure of the liquid in the line 273, with the restrictor 266 working against the supply, so that the pressure of the liquid acting on one end of the operative member 243 becomes outbalanced by that acting on the other end, that is to say, between the pressure $P_1$ acting on the end surface 214a of the detective core plug 214 and the pressure $P_2$ acting on the end surface 239a of the land 239, a differential pressure $P_2 - P_1$ thereby resulting which acts on the operative member 243 in the leftward direction in the drawing.

The operative member 243 is brought to a stop where an equilibrium is reached among the differential pressure $P_2 - P_1$ acting on the operative member, forces of the springs, and force F acting on the detective core. An equation which expresses an equilibrium of the forces acting on the operative member 243 is $$F = A_p(P_2 - P_1) + F_s \tag{4}$$

where, $A_p$ is the area of the pressure-receiving end surface of the detective core plug 214 and that of the land 239;

$P_1$ is the pressure which acts on the end surface 214a of the detective core plug 214 upon equilibrium;

$P_2$ is the pressure which acts on the end surface 239a of the land 239 upon equilibrium;

Fs is the force of the springs upon equilibrium. The circular groove in the valve chamber 236, which is connected to the outlet port 235, has the same breadth as the land 238a of the spool 238 (there is no lap when at rest) so that the control valve 231 functions with good responsiveness, starting the control even for a slight displacement of the operative chamber 243. Since the displacements of the springs are so small that the force Fs is negligible, the formulas (3) and (4) mentioned already can be combined into $$2 \cos \theta \cdot \frac{(\rho \cdot Q)^2}{\rho \cdot A} = A_p (P_2 - P_1) \quad (5)$$

The mass flow rate $(\rho \cdot Q)$ of the flowing liquid supplied from the pressure source 261 is proportional to the differential pressure $(P_2 - P_1)$. Therefore, by using the values $P_1$ and $P_2$ which represent the pressures acting on the respective ends of the operative member 243 and are detected by a detective unit $Pc_1$, $Pc_2$ the mass flow rate can be detected as a differential pressure $(P_2 - P_1)$. Such use of the differential pressure $(P_2 - P_1)$ is also applicable to control of other hydraulic apparatuses (not shown in the drawing) based on the mass flow rate of a flowing liquid supplied from the pressure source 261.

In this example a series of passageways comprising a circular groove 211a, bores 211, chamber 215, and outflow passageways 213 is formed in the detective core 205. Since, however, the objects of the present invention can be accomplished where flowing liquid is led into a control surface including the circumferential surface 205e of the detective core 205 at a certain angle to its axis and led out of it at a certain angle, the present invention does not necessarily require the passageways to be interiorly formed in the detective core 205 in practice, but the detective core 205 can be formed in any shape, provided that it is capable of converting the momentum of flowing liquid into a force.

In the embodiment a sleeve 203 is interposed between the detective core 205 and the main body 202 wherein inflow passageways 217, 217, . . ., circular groove 218a and bores 218 for leading out flowing liquid, and the like are formed. The present invention does not restrict an embodiment to this particular structure but permits the main body 202 itself to have the inflow passageways 217, 217, . . ., circular groove 218a, and the like without using a sleeve 203.

In each of the embodiments hereinbefore described the same value is used for the inflow angle $\theta_1$ at which flowing liquid is led into the control surface including the circumferential surface 205e of the detective core 205 and the outflow angle $\theta_2$ at which the liquid is led out of the control surface, and the same value is used for the sectional area $A_1$ of the inflow opening and the sectional area $A_2$ of the outflow opening. The present invention, however, does not restrict the embodiments to these particular specifications.

The flowing liquid supplied by a first control line 267 and a second control line 270 in the description of the fourth embodiment can be supplied from any point elsewhere, provided that the pressure at the point is used as a reference pressure, and therefore, the junction 265 can be shifted to a point in the passageway 263.

In the fourth embodiment a change in momentum of a flowing liquid is detected by a process wherein the detective core 205 of the operative member 243 converts a change in momentum of flowing liquid into a force; this force is converted into a displacement of the spool 238 of the operative member 243; the pressures of the liquid acting on the two opposite ends of the operative member 243 are controlled in such a manner as to convert the above-mentioned displacement into a differential pressure between the pressures of the liquid acting on the two opposite ends of the operative member 243; and the differential pressure is detected. This process enables detection of mass flow rates without being influenced by changes in viscosity of flowing liquids caused by changes in temperature, and determination of the flow rate where cavitation, bubbling, or the like occurs in the flow. The spool 238, having no part lapping when at rest, is capable of producing a differential pressure for a slight movement of the spool, and therefore counteracts an axial force with good responsiveness and enables instantaneous detection of the mass flow rate. The spool 238 is constantly moved as the flow rate of the flowing liquid varies, and except where the liquid supplied by the lines 273, 274 passes, large differences in pressure are not occasioned, so that a hydraulic lock or silting is not caused even after a long time of use and accordingly good reliability is ensured.

The land 238a of the spool 238 is designed to have no lap when at rest. The present invention does not restrict an embodiment to this specification but permits overlap or underlap to be introduced for the land 238a in the embodiment.

The pressure-receiving area $A_p$ of the two opposite end surfaces 214a, 239a of the operative member 243 can be made smaller where the flow of liquid is small, and yet the differential pressure $P_2 - P_1$ can be made large by narrowing down the flow at the restrictors 266, 269, so that the flow rate can be determined with good accuracy.

This embodiment, having a momentum detective unit 201 and a control valve 231 joined into a single apparatus, is so compact in construction that it can be incorporated into a larger hydraulic mechanism as a part controlling it on the basis of the differential pressure as hereinbefore described.

As will have become understood from the description above, a flowmeter as a fourth embodiment of the present invention consists primarily of a momentum detective unit and a spool. The momentum detective unit may comprise a cylindrical main body having a chamber interiorly opened, a detective core slidably fitting in said chamber, inflow passageways formed in said main body for leading flowing liquid into said detective core at a certain angle to its axis, and outflow passageways formed in said detective core for leading out the liquid drawn in by the inflow passageways into the main body structure at a certain angle to the axis of the detective core; the spool is designed to open a passageway between an outlet port and a plurality of inlet ports in the manner of shifting. This spool and the detective core are joined to form a single operative member, to one end of which is open a first pressure chamber and to the other end a second pressure chamber. A control line having a restrictor at an intermediate point connects the first pressure chamber to the passageway leading to the inflow port or the outflow port of the momentum detective unit and another control line connects the second pressure chamber likewise to said passageway to the inflow or outflow port. Said control line on the downstream side of said restrictor is connected to one of said inlet ports and the other control line likewise to the other inlet port. In a mechanism assembled as above a change in momentum of a flowing liquid can be detected as a difference in the pressures acting on the respective ends of said operative member, hence determination of the mass flow rate is effected. The mass flow rate can thus be determined with accuracy without being influenced by changes in viscosity of the flowing liquid caused by changes in temperature or where cavitation, bubbling, or the like occurs in the flow.

Figure 6:
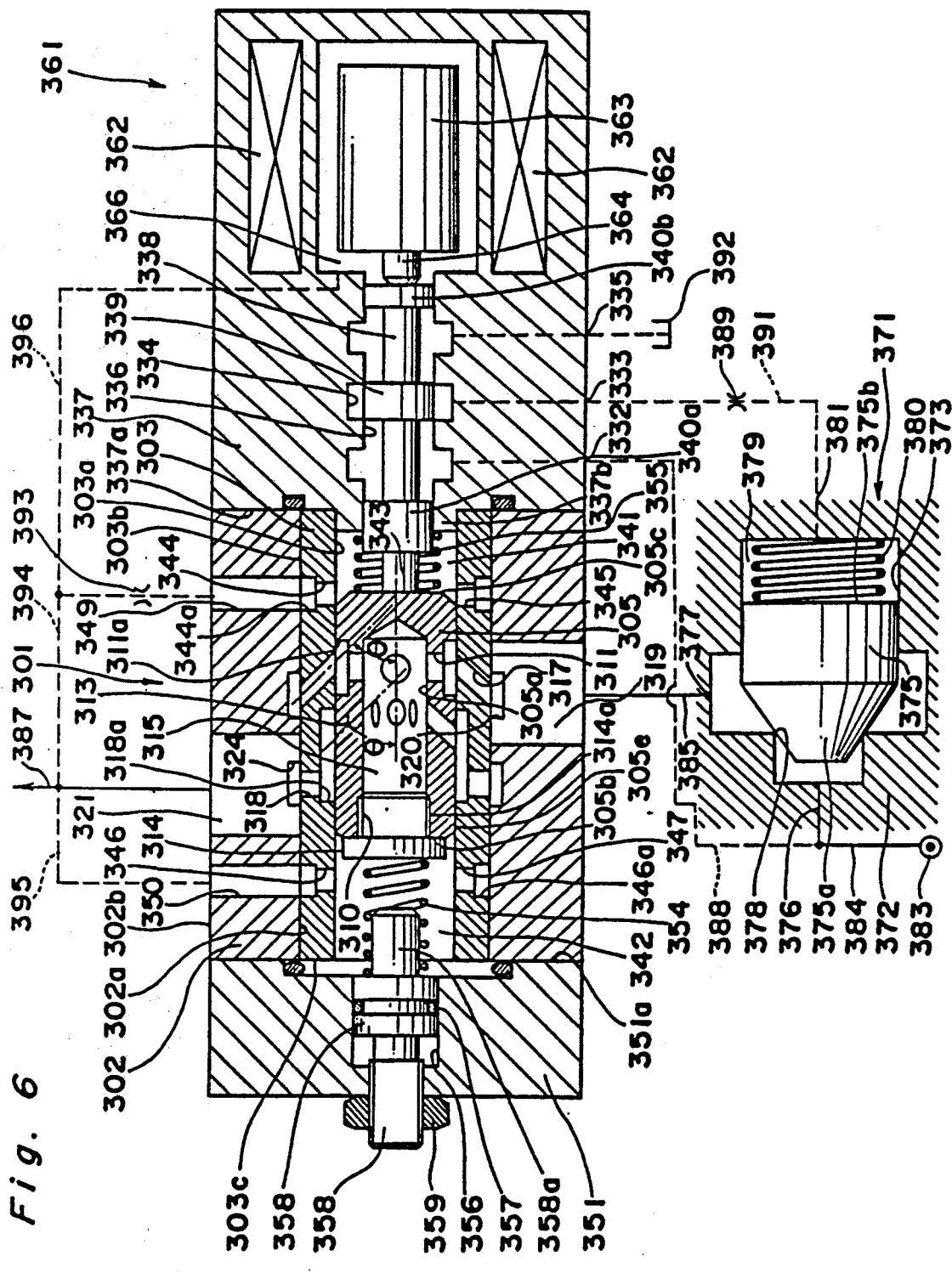
FIG. 6 is illustrative of a flow control valve in a cross-sectional representation as an embodiment of the present invention.

Referring to FIG. 6, there is shown a flow control valve as a fifth embodiment, which primarily consists of a flow detective unit 301, flow-regulating unit 371, and proportional solenoid 361 functioning as a means for setting flow rates.

Said flow detective unit 301 comprises a main body structure 302 which has a cylindrical bore 302a opened in the axial direction, a sleeve 303 fitting in the cylindrical bore 302a, a detective core 305 which is cylindrical in shape and slidably fits in the bore 303a of the sleeve 303, and a spool 338 which is fixed to the detective core 305.

Said detective core 305 has a bore 305a opened axially from the end 305b (at the left in the drawing), and this bore 305a is sealed by a detective core plug 314 screwed therein so that a chamber 315 is formed in the detective core 305. The detective core 305 has a circular groove 311a in its circumferential surface 305e, and four bores 311, 311, . . . each of which is equally distant from each adjacent bore circumferentially and connects the circular groove 311a to said chamber 315. The detective core 305 furthermore has eight outflow passageways 313, 313, . . . each of which is equally distant from each adjacent passageway circumferentially and opened from the chamber 315 to the circumferential surface 305e of the detective core 305 at an angle of θ to the axis of the detective core.

Said sleeve 303 has four inflow passageways 317, 317, . . . each of which is opened from the circumferential surface 303b to the bore 303a at a position equally distant from that of each adjacent inflow passageway circumferentially. The inflow angle which each inflow passageway 317 makes with the axis of the detective core 305 is the same (θ) as the inclination of the outflow passageways 313. Each inflow passageway 317 has the same sectional area as each outflow passageway 313. The sleeve 303 has a circular groove 318a in its inner surface 303a, and eight bores 318, 318, . . . each of which is opened from the circumferential groove 318a to the circumferential surface 303b at a position equally distant from that of each adjacent bore circumferentially.

The inflow port 319 and the outflow port 321 are opened in the main body structure 302. The main body structure 302 has in its inner surface 302a a circular groove 320 which connects the inflow port 319 with said four inflow passageways 317, 317, . . . so as to lead the flowing liquid entering the inflow port 319 into the inflow passageways 317, 317, . . . , and a circular groove 324 which connects the bores 318, 318, . . . in the sleeve 303 with the outflow port 321 so as to discharge from the outflow port 321 the flowing liquid led out by the outflow passageways 313, 313, . . . .

A housing 337 is disposed at a position (at the right in FIG. 6) adjoining the flow detective unit 301 wherein a cylindrical valve chamber 336 connected to a first port 332, second port 333, and discharge port 335 is formed. The housing 337, having a circular edge 337b projected from one end 337a (at the left in the drawing), is joined to the main body structure 302 by fitting the circular edge 337b into the bore 303a of the sleeve 303 and fastened together by bolting or the like (not shown in the drawing). In the valve chamber 336 is slidably fitted a spool 338 which is designed to open and shut the passageway in the valve chamber 336 between the second port 333 and the first port 332 and that between the second port 333 and the discharge port 335 by means of a land 339 provided to the spool 338. The land 339 has no lap when positioned facing the circular groove 334 which is connected to the second port 333. At one end of the spool 338 is formed a land 340b and at the opposite end a land 340a. This land 340a of the spool 338 is fixed to the end 305c (the right end in the drawing) of the detective core 305 by a joining means 343 so that the spool 338 and the detective core 305 move together as one body.

Said proportional solenoid 361 consists of an electromagnetic coil 362 and a movable iron core 363. The end of an axial rod 364 extending from said movable iron core 363 is placed in contact with the end of the land 340b of the spool 338, so that, when the electromagnetic coil 362 is excited, the movable iron core 363 applies to the spool 338 a force (to the left in the drawing) proportional to the impressed voltage for exciting the electromagnetic coil.

On the other hand, an end cover 351 is fixed to one end of the main body structure 302 by bolting (not shown in the drawing). In the middle of the end cover 351 is axially bored a stepped hole 356, into which is fitted an end cover plug 358 having a projection 358a projecting into a chamber 342 (at the left in the drawing) opened to said detective core plug 314 and fixed thereto with a locknut 359. An O-ring 357 is used for sealing between said stepped hole 356 and end cover plug 308. A first spring 354 is placed under compression between the end cover plug 358 and the detective core plug 314, and a second spring 335 is placed under compression between the end 305c (at the right in the drawing) of the detective core 305 and the circular edge 337b projected from the housing 337, so that, when the flow detective unit 301 is not in operation, the detective core 305 is placed at the neutral position under the balancing forces of the first spring 354 and the second spring 355 and, when the detective core 305 moves within a certain range, the connection between each inflow passageway 317 and the circular groove 311a of the detective core 305 is maintained.

Said sleeve 303 has bores 344, 345 which are open into the chamber 341 (at the right in the drawing) defined by the end surface 305c of the detective core 305 and by which the chamber 341 communicates with the outside at all times, and in its circumferential surface 303b a circular groove 344a into which said bores 344, 345 are open. Likewise, the sleeve 303 has bores 346, 347 which are at all times open into the chamber 342 (at the left in the drawing) defined by the end surface of the detective core plug 314 on one side, and in its circumferential surface 303b a circular groove 346a which is connected with said bores 346, 347. The main body structure 302 has a communicating bore 349 which is connected with the circular groove 344a and a communicating bore 350 which is connected with the circular groove 346a so that both the chambers 341 (right) and 342 (left) communicate with outside equipment.

Said flow-regulating unit 371 consists of a housing 372 and a poppet valve 375, said housing 372 interiorly having a cylindrical valve chamber 372 which communicates with the inlet port 376 and outlet port 377 and said poppet valve 375 slidably fitted in said valve chamber 373 and coming intermittently in contact with the valve seat 378 therein. The poppet valve 375 is conical at the end part 375a facing the valve seat 378 and, when moved to this valve seat (to the left in the drawing) in the valve chamber 373, stops the liquid flowing from the inlet port 376 to the outlet port 377 by contact of the end part 375a with the valve seat 378. A spring 380 is placed under compression in the chamber 379 which is defined by the end surface 375b of the poppet valve 375 and the valve chamber 373 and communicates with a pilot port 381 so that said spring 380 applies a force (acting to the left in the drawing) to the poppet valve 375.

The flow-regulating unit 371 has its inlet port 376 connected to the pressure source 383 by a main line 384 and its outlet port 377 to the inflow port 319 of the flow detective unit 301 by a main line 385. The outflow port 321 is connected with a main line 387. A pilot line 388 connects said first port 332 to the main line 384, whereas a pilot line 391 having a restrictor 389 connects said second port 333 to the pilot port 381 of the flow-regulating unit 371. Said discharge port 335 is connected to a tank 392.

A line 394 having a restrictor 393 connects said communicating bore 349 in the main body structure 302 to said main line 387 and a line 395 connects the communicating bore 350 to the main line 387, so that drain produced in the chambers 341, 342 in the flow detective unit 301 is led into the main line 387 for discharge by the bores 344, 345, 346, 347, circular grooves 344a, 346a, communicating bores 349, 350, and lines 394, 395. Said proportional solenoid 361 is of the oil-immersed type, having the movable iron core chamber 366 connected to the line 394 by a line 396.

A flow control valve assembled as above operates as follows.

A flowing liquid supplied from the pressure source 383 flows into the flow detective unit 301 by the main lines 384, 385. The liquid thus entering the flow detective unit 301 flows into the chamber 315 in the detective core 305 by the circular groove 320 in the main body structure 302, four inflow passageways 317, 317, ... in the sleeve 303, circular groove 311a and four bores 311, 311, ... in the detective core 305. The liquid thus flowing into the chamber 315 is led to the outflow port 321 for discharge by the eight outflow passageways 313, 313, ... in the detective core 305, circular groove 318a, the eight bores 318, 318, ... in the sleeve 303, and circular groove 324 in the main body structure 302.

Because the closed curved surface defined by the circumferential surface 305e and the two opposite end surfaces 305b of the detective core 305, 305c can be considered as a control surface, a change in the momentum which the liquid undergoes inside the control surface as it flows into the control surface at a certain angle to the axis of the detective core 305 by the inflow passageways 317, 317, ... and flows out at a certain angle by the outflow passageways 313, 313, ... positioned inside the control surface is equal to the force F which acts on the object (the detective core 305 in this instance) positioned inside the control surface, and this force F can be determined by the formula (2) mentioned before. In this embodiment, as mentioned before, the inclination $\theta_1$ of each inflow passageway 317 is the same $(=\theta)$ as that $\theta_2$ of each outflow passageway 313 and the sectional area $A_1$ of the inflow opening is the same as that $A_2$ of the outflow opening. Therefore, as expressed by the formula (3), the liquid flowing into the control surface including the circumferential surface 305e and flowing out of it causes a force F which is proportional to the mass flow rate of the flowing liquid to act on the detective core 305 to the right in FIG. 6. The circumferential surface of the detective core 305 which defines a part of said control surface in this example means the cylindrical surface which the detective core 305 forms (that is, the inner surface 303a of the sleeve 303), including the surfaces 305e, 305e, ... which are in contact with the inner surface 303a of the sleeve 303.

On the other hand, said proportional solenoid 361 is applying to the detective core 305 a force in the direction opposite to that of said force F. When the flow of the liquid in the main lines 385, 387 exceeds a set value, the force F acting on the detective core 305, caused by changes in momentum of the flowing liquid, increases, so that the detective core 305 moves from the position where the force applied to the detective core are balanced with that of the proportional solenoid 361 to a position to the right in the drawing by counteracting the forces from the proportional solenoid and the second spring 355. Then, the land 339 of the spool 338 opens a passageway between the first port 332 and the second port 333 so that the liquid supplied by the pilot line 388 is redirected to the pilot port 381 by the pilot line 391 having a restrictor 389, causing the poppet valve 375 at the flow-regulating unit 371 to move to the left in FIG. 6 and thus narrow down the opening between the inlet port 376 and outlet port 377. As a result, the flow of the liquid supplied to the detective core 305 is decreased and the mass flow rate is adjusted to a set value corresponding to the impressed current of the proportional solenoid 361. The decrease in the flow causes the force F acting on the detective core 305 to be decreased by changes in the momentum and the detective core 305 resumes the position where its force balances the opposing force from the proportional solenoid 361.

When the flow of the liquid in the main lines 385, 387 falls below a set value, the force F acting on the detective core 305 decreases. Then, the detective core 305 moves from the position where the forces are balanced to a position to the left in the drawing under the outbalancing force from the proportional solenoid 361. The land 339 opens a passageway between the second port 333 and the discharge port 335 so that the liquid in the chamber 379 is discharged into a tank 392 by the pilot line 391 and the poppet valve 375 is moved to the right (in the drawing) to enlarge the opening under the pressure of the flowing liquid supplied from the inlet port. As a result, the flow of the liquid supplied to the detective core 305 increases and the mass flow rate is restored to a set value. The force F acting on the detective core 305 increases as the flowing liquid gains in momentum and the detective core 305 resumes the position where its force balances with the opposing force from the proportional solenoid 361. By repeating the above-mentioned processes this flow control valve regulates the mass flow rate of the liquid in the main line 387 to a set value which corresponds to the force from the proportional solenoid 361.

This flow control valve, designed to regulate the flow of liquids by detecting the mass flow rate by means of a detective core 305, is capable of adjusting the mass flow rate to a set value with accuracy without being influenced by changes in viscosity caused by changes in temperature or where cavitation, bubbling, or the like occurs in the flow. Since this flow control valve functions on the basis of the mass flow rate, the flow can be regulated to a set rate even if the pressures differ between the upstream side and the downstream side of the flow-regulating unit 371.

In the embodiment hereinabove described, the spool 338 is designed to have no lap, and the detective core 305 and the spool 338 are joined in one body. These structural features make it possible for a slight movement of the detective core 305 to actuate the flow-regulating unit 371 and thus ensure good responsiveness.

In the embodiment above, a series of passageways comprising circular groove 311a, bores 311, chamber 315, and outflow passageways 313 are formed in the detective core 305. The object of the present invention, however, can be accomplished where the mass flow rate of a flowing liquid is determined by detecting changes in the momentum which the liquid undergoes as it flows into a control surface including the circumferential surface 305e of the detective core 305 at a certain angle to the control surface and flows out of it at a certain angle, and accordingly, the present invention does not necessarily require passageways to be formed in the detective core 305 in an embodiment. The detective core can be made in any shape, provided that it is capable of converting a change in momentum of flowing liquid into a force.

In the embodiment above a sleeve 303 is interposed between the main body structure 302 and the detective core 305 wherein inflow passageways 317, 317, ..., circular groove 318a and bores 318 for leading out the flowing liquid, and the like are formed. The present invention does not restrict its embodiments to this particular structure but permits the main body structure 302 itself to have the inflow passageways without using a sleeve 303. In the embodiment above, the same value is used for the inflow angle $\theta_1$ and for the outflow angle $\theta_2$ at which the liquid flows into and out of the detective core 305 and the same value for the sectional area $A_1$ of the inflow opening and for that $A_2$ of the outflow opening. Nevertheless, the present invention permits the angles to be inclined only with respect to either the inflow or the outflow or to differ between the inflow and the outflow, and also permits the sectional area to differ between the inflow opening and the outflow opening.

In the embodiment above, the land 338a of the spool 338 has no lap. The present invention does not restrict its embodiments to this particular specification but permits the land to show overlap or underlap. The means for setting the flow rate is not restricted to a proportional solenoid but a hand lever working with a spring can be substituted in the practice of the present invention.

As will have become understood from the foregoing description, a flow control valve of the present invention consists of a flow detective unit and a flow-regulating unit, both of which are installed in a supply passageway for a flow of liquid, and operates on a mechanism wherein a change in momentum of the flowing liquid is made to act on the detective core in the flow detective unit as a force, which is counteracted by a force from a means for setting the flow rate being a constituent unit of said valve in such a manner as to actuate a spool joined to said detective core by a balancing force so that a poppet valve in said flow-regulating unit is actuated to adjust the flow of liquid. The flow of a liquid can thus be regulated by detecting the mass flow rate, that is to say, the mass flow rate of a flowing liquid can be adjusted to a set value with accuracy, without being influenced by changes in viscosity caused by changes in temperature, and where cavitation, bubbling, or the like occurs in the flow.

Figure 7:
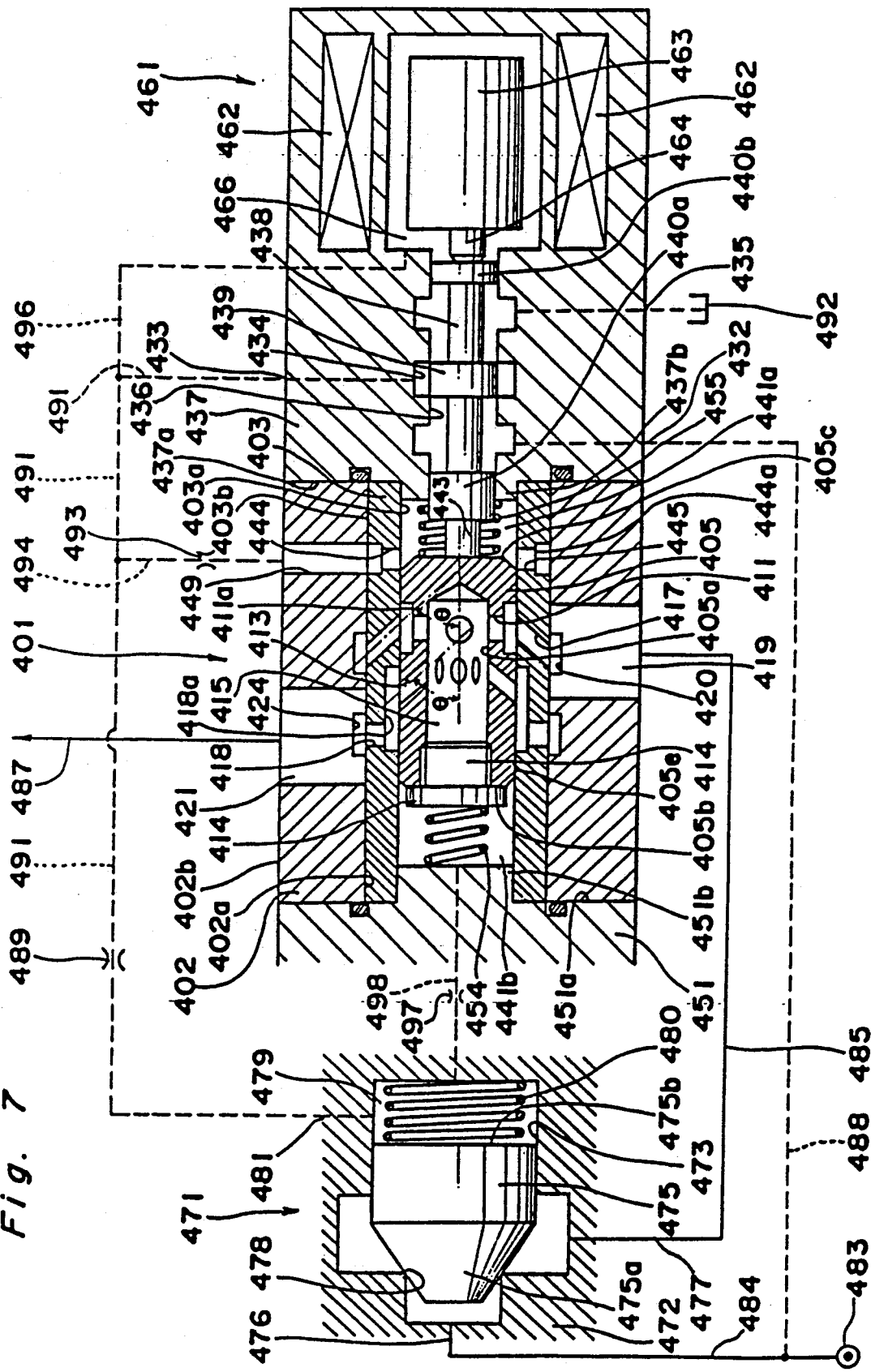
FIG. 7 is illustrative of a flow control valve in a cross-sectional representation as another embodiment differing from that shown by FIG. 6.

Referring to FIG. 7, there is shown a flow control valve as a sixth embodiment, which consists primarily of a flow detective unit 401, a flow-regulating unit 471, and a proportional solenoid 461 as a means for setting the mass flow.

Said flow detective unit 401 comprises in the main a main body structure 402 having a cylindrical bore 402a opened in the axial direction, a sleeve 403 fitting in said cylindrical bore 402a, a detecting core 405 which is cylindrical in shape and slidably fits in the bore 403a of said sleeve 403, and a spool 438 fixed to said detective core 405.

Said detective core 405 has a bore 405a which is opened axially from its end 405b (at the left in the drawing) and sealed with a detective core plug 414 screwed in at the opening so that a chamber 415 is formed in the detective core 405. The detective core 405 has in its circumferential surface 405e a circular groove 411a, which communicates with said chamber 415 by four bores 411, 411, ... opened each at an equal distance from each adjacent bore circumferentially. The detective core 405 furthermore has eight outflow passageways 413, 413, ... bored from the chamber 415 to the circumferential surface 405e, each outflow passageway 413 being equally distant from each adjacent outflow passageway circumferentially and making an angle of $\theta$ with the axis of the detective core 405.

Said sleeve 403 has four inflow passageways 417, 417, ... bored from the circumferential surface 403b to the bore 403a each at an equal distance from each adjacent inflow passageway circumferentially. The inflow angle which each inflow passageway 417 makes with the axis of the detective core 405 is the same ($=\theta$) as the outflow angle of the outflow passageways 413. Each of these inflow passageways 417, 417, ... has the same sectional area as each outflow passageway 413. The sleeve 403 furthermore has a circular groove 418a in its inner surface 403a and eight bores 418, 418, ... opened from the circular groove 418a to the circumferential surface 403b each at an equal distance from each adjacent bore circumferentially.

The inflow port 419 and the outflow port 421 are opened in the main body structure 402. The main body structure 402 furthermore has in its inner surface 402a a circular groove 420 which connects the inflow port 419 with the four inflow passageways 417, 417, ... so that the flowing liquid entering the inflow port 419 is led into the inflow passageways 417, 417, .... Likewise, the main body structure 402 has a circular groove 424 which connects the bores 418, 418, ... in the sleeve 403 with the outflow port 421 so that the liquid flowing out by the outflow passageways 413, 413, ... is discharged by the outflow port 421.

Adjacently to (at the right in FIG. 7) the flow detective unit 401 is disposed a housing 437 interiorly having a valve chamber 436 which is cylindrical in shape and communicates with an entry port 432, exit port 433, and discharge port 435. The housing 437 having a circular edge 437b projecting from one and surface 437a (at the left in the drawing) is joined to the main body structure 402 by fitting said circular edge 437b into the bore 403a of the sleeve 403 and fastened together by bolting and the like (not shown in the drawing). In said valve chamber 436 is slidably fitted a spool 438 having a land 439 which opens and shuts a passageway between the exit port 433 and the entry port 432 and another between the exit port 433 and the discharge port 435. The land 439 has no lap when positioned facing the circular groove 434 which communicates with the exit port 433. The spool 438 has at one end a land 440b and at the other end a land 440a, the latter land being fixed to the end 405c (at the right in the drawing) of the detective core 405 by a joining means 443 so that the spool 438 moves together with the detective core 405 as one body.

Said proportional solenoid 461 consists of an electromagnetic coil 462 and a movable iron core 463. The end of the axial rod 464 projecting from the movable iron core 463 is in contact with the end surface of the land 440b of the spool 438 so that, when the electromagnetic coil 462 is excited, the movable iron core 463 applies to the spool 438 a force (to the left in the drawing) proportional to the impressed current for the excitation.

An end cover 451 having a circular projection 451b in the middle of its inward side 451a is joined to the end (at the left in FIG. 7) of the main body structure 402 by fitting the circular projection 451b into the bore 403a of the sleeve 403 and fastened together by bolting (not shown in the drawing). A first spring 454 is placed under compression between the inward side 451a of the end cover 451 and the detective core plug 414 and a second spring 455 is placed under compression between the end surface 405c (at the right in the drawing) of the detective core 405 and the circular edge 437b projecting from the housing 437 so that, when the flow detective unit 401 is not in operation, the detective core 405 is placed at the neutral position where the force of the first spring 454 is balanced by that of the second spring 455 and, when the detective core 405 moves within a certain range, the connection between the inflow passageways 417, 417, . . . and the circular groove 411a in the detective core 405 is maintained.

Said sleeve 403 has bores 444, 445 by which the chamber 441a (at the right in the drawing) defined on one side by the end surface 405c (at the right in the drawing) of the detective core 405 communicates with the outside of the sleeve 403 at all times, and in its circumferential surface 403b a circular groove 444a with which the bores 444, 445 are connected. On the other hand, the main body structure 402 has a communicating bore 449 which meets the circular groove 444a.

Said flow-regulating unit 471 consists primarily of a housing 472 which interiorly has a valve chamber 473 which is cylindrical in shape and communicates with an inlet port 476 and an outlet port 477 and a poppet valve 475 which is slidably fitted in the valve chamber 473 and intermittently comes in contact with a valve seat 478 therein. The poppet valve 475 is conical at the end part 475a facing the valve seat 478 and, when moved to this valve seat (to the left in the drawing) in the valve chamber 473, stops the liquid flowing from the inlet port 476 to the outlet port 477 by contact of the end part 475a with the valve seat 478. A spring 480 is placed under compression in the pilot chamber 479 which is defined by the end surface 475b of the poppet valve 475 and the valve chamber 473 and communicates with a pilot port 481 so that said spring 380 applies a force (acting to the left in the drawing) to the poppet valve 475.

A main line 484 connects the inlet port 476 of the flow-regulating unit 471 to the pressure source 483 and a main line 485 connects the outlet port 477 to the inflow port 419 of the flow detective unit 401. The outflow port 421 is connected with a main line 487. A pilot line 488 connects said entry port 432 to the main line 484. Said exit port 433 is connected to the pilot port 481 of the flow-regulating unit 471 by a pilot line 491 having a restrictor 489. The discharge port 435 is connected to a tank 492. A line 498 having a restrictor 497 connects said pilot chamber 479 of the flow-regulating unit 471 to the chamber 441b (at the left in the drawing) which is defined on one side by the end surface of the detective core plug 414.

A line 494 having a restrictor 493 connects the communicating bore 449 opened in the main body structure 402 to the pilot line 491 at a point between the restrictor 489 and the exit port 433. Said proportional solenoid 461 is of the oil-immersed type, a line 496 connecting the movable iron core chamber 466 to said pilot line 491.

A flow control valve assembled as above operates as follows.

The liquid supplied from the pressure source 483 flows into the flow detective unit 401 by main lines 484, 485. The flowing liquid entering the flow detective unit 401 flows into the chamber 415 in the detective core 405 by the circular groove 420 in the main body structure 402, the four inflow passageways 417, 417, . . . bored in the sleeve 403, and the circular groove 411a and four bores 411, 411, opened in the detective core 405. The flowing liquid is led out of the chamber 415 to the outflow port 421 by the eight outflow passageways 413, 413, . . . bored in the detective core 405, circular groove 418a and the eight bores 418, 418, . . . opened in the sleeve 403, and the circular groove 424 in the main body structure 402 and discharged.

Since the closed curved surface defined by the circumferential surface 405e and the two opposite ends 405b, 405c of the detective core 405 can be considered as a control surface, a change in the momentum which a flow liquid undergoes inside the control surface as it flows into the control surface at a certain angle to the axis of the detective core 405 by the inflow passageways 417, 417, . . . and flows out at a certain angle by the outflow passageways 413, 413, . . . positioned inside the control surface is equal to the force F which acts on the object (the detective core 405 in this instance) positioned inside the control surface, and this force F can be obtained by the formula (2) already mentioned. In this embodiment, as described already, the inclination $\theta_1$ which each inflow passageway 417 makes is the same ($=\theta$) as that $\theta_2$ of each outflow passageway 413 and the sectional area $A_1$ of the inflow opening is the same as that $A_2$ of the outflow opening. As expressed by the formula (3), a flowing liquid, as it flows into the control surface including the circumferential surface 405e and flows out of the control surface, causes a force F which is proportional to the mass flow rate of the flowing liquid to act on the detective core 405 in the rightward direction according to the relevant drawing. The circumferential surface of the detective core 405 which defines a part of said control surface means the cylindrical surface (which is equivalent to the inner surface 403a of the sleeve 403) of the detective core 405 which includes the surfaces 405e, 405e, . . . being in contact with the inner surface 403a of the sleeve 403.

On the other hand, a force from the proportional solenoid 461 acts on the detective core 405 in the direction opposed to that of the force F. Therefore, when the flow of the liquid in the main lines 485, 487 exceeds a set value, change in momentum of the flowing liquid causes the force F acting on the detective core 405 to increase, resulting in shift of the detective core 405 from the position where its force balances that of the proportional solenoid 461 to a position to the right according to the relevant drawing as against the opposing forces of the proportional solenoid 461 and the second spring 455 both acting on the detective core 405. Then, the land 439 of the spool 438 opens a passageway between the entry port 432 and the exit port 433 so that the liquid supplied by the pilot line 488 is conveyed to the pilot port 481 by the pilot line 491 having a restrictor 489. As a result, the poppet valve 475 of the flow-regulating unit 471 is moved to the left according to FIG. 7, narrowing the opening between the inlet port 476 and the outlet port 477, and thus the flow of the liquid supplied to the detective core 405 is decreased in such a way that the mass flow rate is adjusted to a set rate corresponding to the impressed current for exciting the proportional solenoid 461.

Contrary, when the flow of the liquid in the main lines 485, 487 falls below the set value, the force F acting on the detective core 405 decreases. Then, the detective core 405 is moved from the position of equilibrium to a position to the left according to the relevant drawing under the outbalancing force of the proportional solenoid 461, and the land 439 opens a passageway between the exit port 433 and the discharge port 435, so that the liquid in the pilot chamber 479 is discharged into the tank 492 by a pilot line 491 with the result that the poppet valve 475 is moved to the right (in Fig, 7), enlarging the opening, under the pressure of the liquid flowing in by the inlet port. Thus the flow of the liquid entering the detective core 405 is increased and the mass flow rate is restored to a set value.

As the result of adjustment of the flow by the flow-regulating unit 471, the force F acting on the detective core 405, representing the change of momentum of the liquid, changes, as the flow of the liquid flowing into the detective core 405 changes, in such a way as to cause the detective core 405 to return to the position of equilibrium where the force F balances the force from the proportional solenoid 461. Since this change in the force F acting on the detective core 405 corresponding to a change in momentum of the liquid does not occur until the liquid having passed the poppet valve 475 of the flow-regulating unit 471 after the actuation of the poppet valve and conveyed by the main line 485 passes through the detective core 405, a time lag is inevitable between the actuation of the poppet valve 475 and the change in the force F under the influences of the mass and compressibility of the liquid in the main line 485 and consequently the opening allowed by the poppet valve 475 at the flow-regulating unit 471 is inevitably subject to unstable excessive control. In the present embodiment, however, a feedback operates for precluding the time lag and for preventing the poppet valve 475 of the flow-regulating unit 471 from controlling the opening irregularly and to excess. The feedback mechanism is as follows. When, for example, the flow detected exceeds the set value and the detective core 405 is moved to the right (according to FIG. 7), causing the poppet valve 475 of the flow-regulating unit 471 to narrow the opening, the pressure of the liquid supplied from the exit port 433 to the movable iron core chamber 466 by the line 496 and that of the liquid supplied from the exit port 433 to the chamber 441a (at the right in FIG. 7) opened to the right end (according to FIG. 7) of the detective core 405 by the line 494 disposed on the upstream side of the restrictor 489 outbalance the pressure of the liquid supplied from the exit port 433 to the chamber 441b (at the left in FIG. 7) opened to the left end (according to FIG. 7) of the detective core 405 by the pilot line 491 having a restrictor 489, through the pilot chamber 479 of the flow-regulating unit 471, and the line 498, so that almost simultaneously with the detection of the readjusted mass flow rate a force acts in advance on the detective core 405, that is, on the spool 438 as well, in the direction reverse to that of the spool control. It does not occur, therefore, for the spool, that is, the opening controlled by the poppet valve 475 as well, to operate in excess. Thus the time lag with which the force F is produced by changes in the flow in the main lines as against the relevant actuation of the poppet valve 475 is moderated satisfactorily, so that the flow of a liquid can be readjusted quickly to a set value and stability is quickly restored.

Contrarily, when the detected flow rate falls below the set value and the detective core 405 is moved to the left (in FIG. 7) and the poppet valve 475 to the right (in FIG. 7) so as to enlarge the opening, part of the liquid discharged from the pilot chamber 479 of the flow-regulating unit 471 flows into the chamber 441b defined by the left end (in FIG. 7) of the detective core 405 by the line 498 having a restrictor 497. Since the pressure of this liquid in the chamber 441b outbalances the pressure of the liquid in the chamber 441a (at the right in FIG. 7) is connected to the tank 492 by the line 494 and the pilot line 491 and the pressure of the liquid in the movable iron core chamber 466 which is connected to the tank 492 by the line 496, a rightward (in FIG. 7) feedback then acts on the detective core 405, that is, on the spool 438 as well, by the line 498 so that it does not occur for the poppet valve 475 to control the opening to excess. The flow of a liquid, therefore, can be adjusted quickly to a set value and stability is quickly restored.

By repeating the processes described above, this flow control valve quickly adjusts the flow of a liquid in the main line 487 in terms of mass flow to the set rate corresponding to the force which the proportional solenoid 461 is set to exert.

This flow control valve is designed to regulate the flow of a liquid by detecting the mass flow by the detective core 405 so that the flow can be adjusted accurately in terms of mass flow, to a set rate, without being influenced by changes in viscosity of the liquid caused by changes in temperature and where cavitation, bubbling, or the like occurs in the flow. Since this flow control valve operates on the basis of mass flow rate, it is capable of regulating a flow to a set rate independently of a difference in pressures between the upstream side and the downstream side of the flow-regulating unit 471 or the force of the liquid acting on the poppet valve 475. When the flow is adjusted, the force of a feedback by the line 498 acts on the detective core 405 in advance of the detection of the adjusted flow in the main line 485, so that the poppet valve 475 is prevented from adjusting the opening to excess and the mass flow rate can be adjusted quickly to a set value.

In the embodiment described above, the spool 438 has no lap, and the detective core 405 and the spool 438 are joined as one body so that a slight movement of the detective core 405 can actuate the flow-regulating unit 471 and thus good responsiveness is ensured.

In the embodiment above, a series of passageways comprising a circular groove 411a, bores 411, chamber 415, and outflow passageways 413 are formed in the detective core 405. The object of the present invention, however, can be accomplished where the mass flow rate of a flowing liquid is determined by detecting changes in the momentum which the liquid undergoes as it flows into a control surface including the circumferential surface 405e of the detective core 405 at a certain angle and flows out of it at a certain angle, and accordingly, the present invention does not necessarily require passageways to be formed in the detective core 405 in an embodiment. The detective core can be made in any shape, provided that it is capable of converting a change in momentum of flowing liquid into a force.

In the embodiment above, a sleeve 403 is interposed between the main body structure 402 and the detective core 405 wherein inflow passageways 417, 417, . . . , circular groove 418a and bores 418 for leading out the flowing liquid, and the like are formed. The present invention does not restrict its embodiments to this particular structure but permits the main body structure 402 itself to have the inflow passageways without using a sleeve 403. In the embodiment above, the same value is used for the inflow angle $\theta_1$ and for the outflow angle $\theta_2$ at which the flowing liquid flows into and out of the detective core 405 and the same value for the sectional area $A_1$ of the inflow opening and for that $A_2$ of the outflow opening. Nevertheless, the present invention permits the angle of either the inflow or the outflow to be oblique or to differ between the inflow and the outflow, and also permits the sectional area to differ between the inflow opening and the outflow opening.

In the embodiment above, the land 438a of the spool 438 has no lap. The present invention does not restrict its embodiments to this particular specification but permits the land to show overlap or underlap. The means for setting the mass flow rate is not restricted to a proportional solenoid but a hand lever working with a spring can be substituted in the practice of the present invention.

As will have become understood from the foregoing description, a flow control valve as an embodiment of the present invention has its flow detective unit and flow-regulating unit installed in a passageway for a flow of liquid subject to the regulation, and operates on a mechanism wherein a change in momentum of the flowing liquid is made to act on the detective core in the flow detective unit as a force, which is counteracted by a force from a means for setting the mass flow rate in such a manner as to actuate a spool joined to said detective core by the opposing forces so that a valve element in said flow-regulating unit is actuated to adjust the flow of liquid. The flow of a liquid can thus be regulated by detecting the mass flow rate, that is to say, the mass flow rate of a flowing liquid can be adjusted to a set value with accuracy, without being influenced by changes in viscosity caused by changes in temperature, and where cavitation, bubbling, or the like occurs in the flow. In this embodiment, furthermore, the pilot chamber of the flow-regulating unit is connected to the exit port by a pilot line having a restrictor, and one chamber in which one end of the detective core is fitted in is connected to a point in the circuit between said restrictor and exit port, whereas another chamber in which the other end of the detective core is fitted in is connected to the pilot chamber of the flow-regulating unit. When a flow of liquid is adjusted, said detective core detects inflow of the flowing liquid whose mass flow rate has been adjusted by the flow-regulating unit. The advantage of the above arrangement is that, in advance of this detection by the detective core, pressures of liquid cause a force to act on the detective core, that is, on the spool as well, in the direction reverse to that of the spool control so that the valve element of the flow-regulating unit is prevented from excessive control and the mass flow rate can be quickly adjusted to a set value.

Figure 8:
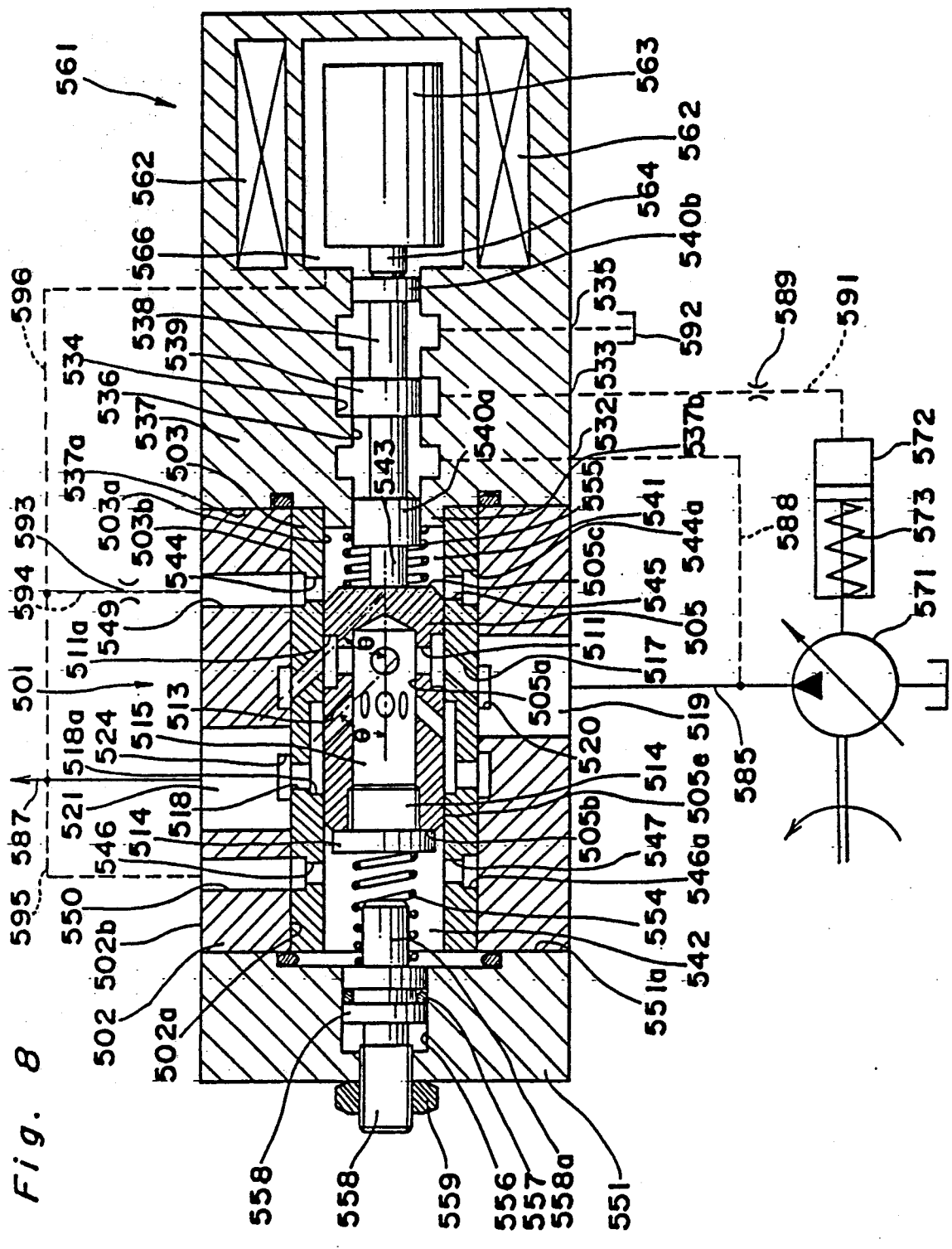
FIG. 8 is illustrative of a hydraulic apparatus in a cross-sectional representation as an embodiment of the present invention.
Figure 9:
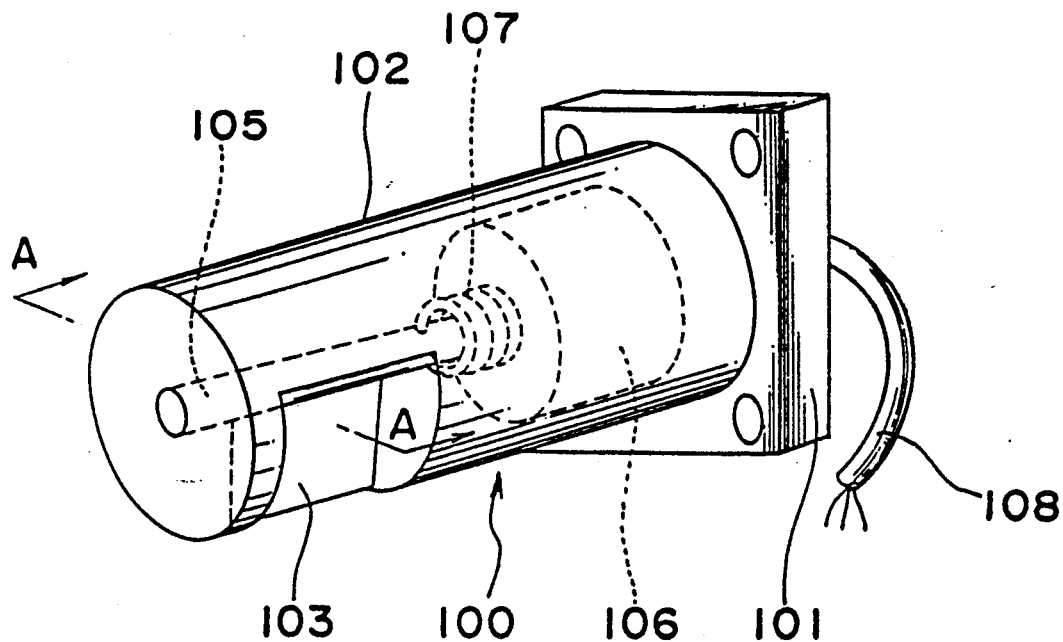
FIG. 9 is a perspective view of a prior art flowmeter.
Figure 10:
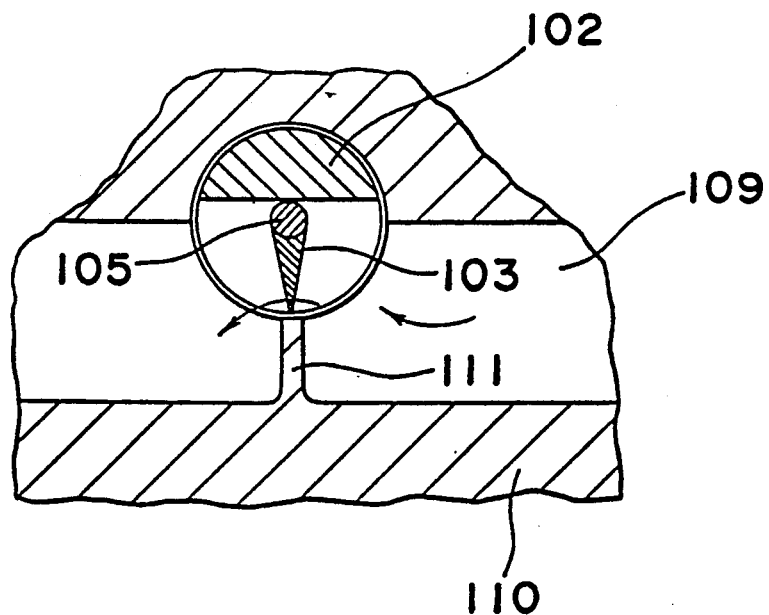
FIG. 10 is the same prior art flowmeter installed in place in a passageway of flowing liquid in a cross-sectional representation along the line A—A as indicated in FIG. 9.

Referring to FIG. 8, there is shown a hydraulic apparatus as a seventh embodiment of the present, which consists primarily of a flow detective unit 501, a variable displacement pump 571, and a proportional solenoid 561 as a means for setting the mass flow rate.

Said flow detective unit 501 comprises a main body structure 502 having a cylindrical bore 502a in the axial direction, a sleeve 503 fitting in said cylindrical bore 502a, a detective core 505 which is cylindrical in shape and slidably fits in the bore 503a of the sleeve 503, and a spool 538 which is fixed to the detective core 505.

Said detective core 505 has a bore 505a axially opened from the end 505b (at the left in FIG. 8) of the detective core 505 and sealed with a detective core plug 514 screwed in at the opening so that a chamber 515 is formed in the detective core 505. The detective core 505 has in its circumferential surface 505e a circular groove 511a, which communicates with said chamber 515 by four bores 511, 511, . . . opened each at an equal distance from each adjacent bore circumferentially. The detective core 505 furthermore has eight outflow passageways 513, 513, . . . bored from the circumferential surface 505e to the chamber 515, each outflow passageway 513 being equally distant from each adjacent outflow passageway circumferentially and making an angle of $\theta$ with the axis of the detective core 505.

Said sleeve 503 has four inflow passageways 517, 517, . . . bored from the circumferential surface 503b to the bore 503a each at an equal distance from each adjacent inflow passageway circumferentially. The inflow angle which each inflow passageway 517 makes with the axis of the detective core 505 is the same ($=\theta$) as the outflow angle of the outflow passageway 513. Each of these inflow passageways 517, 517, . . . has the same sectional area as each outflow passageway 513. The sleeve 503 furthermore has a circular groove 518a in its inner surface 503a and eight bores 518, 518, . . . opened from the circular groove 518a to the circumferential surface 503b each at an equal distance from each adjacent bore circumferentially.

The inflow port 519 and the outflow port 521 are opened in the main body structure 502. The main body structure 502 furthermore has in its inner surface 502a a circular groove 520 which connects the inflow port 519 with the four inflow passageways 517, 517, . . . so that the flowing liquid entering the inflow port 519 is led into the inflow passageways 517, 517, . . . . Likewise, the main body structure 502 has a circular groove 524 which connects the bores 518, 518, . . . in the sleeve 503 with the outflow port 521 so that the liquid flowing out by the outflow passageways 513, 513, . . . is discharged by the outflow port 521.

Adjacently to (at the right in FIG. 8) the flow detective unit 501 is disposed a housing 537 interiorly having a valve chamber 536 which is cylindrical in shape and communicates with an entry port 532, exit port 533, and discharge port 535. The housing 537 having a circular edge 537b projecting from one end surface 537a (at the left in FIG. 8) is joined to the main body structure 502 by fitting said circular edge 537b into the bore 503a of the sleeve 503 and fastened together by bolting or the like (not shown in the drawing). In said valve chamber 536 is slidably fitted a spool 538 having a land 539 which opens and shuts a passageway between the exit port 533 and the entry port 532 and another between the exit port 533 and the discharge port 535. The land 539 has no lap when positioned facing the circular groove 534 which communicates with the exit port 533. The spool 538 has at one end a land 540b and at the other end a land 540a, the latter land being fixed to the end 505c (at the right in FIG. 8) of the detective core 505 by a joining means 543 so that the spool 538 moves together with the detective core 505 as one body.

Said proportional solenoid 561 consists of an electromagnetic coil 562 and a movable iron core 563. The end of the axial rod 564 projecting from the movable iron core 563 is in contact with the end surface of the land 540b of the spool 538 so that, when the electromagnetic coil 562 is excited, the movable iron core 563 applies to the spool 538 a force (to the left in FIG. 8) proportional to the impressed current for the excitation.

An end cover 551 is fixed to one end of the main body structure 502 by bolting (not shown in the drawing). In the middle of the end cover 551 is axially bored a stepped hole 556, into which is fitted an end cover plug 558 having a projection 558a projecting into a chamber 542 (at the left in FIG. 8) opened to said detective core plug 514 and fixed thereto with a locknut 559. An O-ring 557 is used for sealing between said stepped hole 556 and end cover plug 508. A first spring 554 is placed under compression between the end cover plug 558 and the detective core plug 514, and a second spring 555 is placed under compression between the end 505c (at the right in FIG. 8) of the detective core 505 and the circular edge 537b projecting from the housing 537, so that, when the flow detective unit 501 is not in operation, the detective core 505 is placed at the neutral position under the balancing forces of the first spring 554 and the second spring 555 and, when the detective core 505 moves within a certain range, the connection between each inflow passageway 517 and the circular groove 511a of the detective core 505 is maintained.

Said sleeve 503 has bores 554, 545 by which the chamber 541 (at the right in FIG. 8) defined on one side by the end surface 505c (at the right in FIG. 8) of the detective core 505 communicates with the outside of the sleeve 503 at all times, and in its circumferential surface 503b a circular groove 544a with which the bores 544, 545 are connected. The sleeve 503 has bores 546, 547 which are at all times open into the chamber 542 (at the left in FIG. 8) defined by the end surface of the detective core plug 514, and in its circumferential surface 503b a circular groove 546a which is connected with the bores 546, 547. The main body structure 502 has communicating bores 549, 550, the bore 549 being connected with the circular groove 544a and the bore 550 with the circular groove 546a so that both the chambers 541 (at the right in FIG. 8) and 542 (at the left) communicate with outside equipment.

Said variable displacement pump 571 variably controls the discharge under the pressure of liquid. For example, one such pump is equipped with a discharge control unit 572 consisting of a swash-plate control cylinder. When no pressure of liquid is acting, the discharge control unit 572 sets the variable discharge pump 571 for the maximum discharge under the force of the spring 573.

The discharge port of the variable displacement pump 571 is connected to the inflow port 519 of said flow detective unit 501 by a pressure line 585, and the outflow port 521 is connected with a main line 587. Said entry port 532 is connected to the pressure line 585 by a pilot line 588. Said exit port 533 is connected to the no-spring end of the discharge control unit 572 by a pilot line 591 having a restrictor 589. Said discharge port 535 is connected to a tank 592.

Said communicating bore 549 formed in the main body structure 502 is connected to the main line 587 by a line 594 having a restrictor 593 and the other communicating bore 550 is also connected to the same main line passageway 587 by a line 595 so that drain produced in the chambers 541, 542 of the flow detective unit 501 is discharged into the main line passageway 587 by the bores 544, 545, 546, 547, circular grooves 544a, 546a, communicating bores 549, 550, and lines 594, 595. Said proportional solenoid 561 is of the oil-immersed type, a line 596 connecting its movable iron core chamber 566 to the line 594.

A hydraulic apparatus assembled as above operates as follows.

A flowing liquid supplied from said variable displacement pump 571 flows into the flow detective unit 501 by a pressure line 585. The liquid thence is led into the chamber 515 of the detective core 505 by the circular groove 520 in the main body structure 502, four inflow passageways 517, 517, . . . in the sleeve 503, and circular groove 511a and the four bores 511, 511, . . . in the detective core 505, and led out of the chamber 515 to the outflow port 521 by the eight outflow passageways 513, 513, . . . in the detective core 505, circular groove 518a and eight bores 518, 518, . . . in the sleeve 503, and circular groove 524 in the main body structure 502 and thence discharged.

Since the closed curved surfaces defined by the circumferential surface 505e and the two opposite ends 505b, 505c of the detective core 505 can be considered as a control surface, a change in the momentum which a flowing liquid undergoes inside the control surface as it flows into the control surface at a certain angle to the axis of the detective core 505 by the inflow passageways 517, 517, . . . and flows out at a certain angle by the outflow passageways 513, 513, . . . formed inside the control surface is equal to the force F which acts on the object (the detective core 505 in this instance) positioned inside the control surface, and the value of this force F can be obtained by the formula (2) already mentioned. In this embodiment as has been mentioned, the same value $\theta$ is used for the angle $\theta_1$ of inclination of each inflow passageway 517 and that $\theta_2$ of each outflow passageway, and the same value is used for the sectional area $A_1$ of the inflow opening and that $A_2$ of the outflow opening. Thence, as expressed by the formula (3), a flowing liquid, as it flows into the control surface including the circumferential surface 505e and flows out of it, causes a force F which is proportional to the mass flow rate of the flowing liquid to act on the detective core 505 in the axial direction. The circumferential surface of the detective core 505 which defines a part of said control surface means the cylindrical surface (which is equivalent to the inner surface 503a of the sleeve 503) of the detective core 505 which includes the surfaces 505e, 505e, being in contact with the inner surface 503a of the sleeve 503.

Coincidentally, a force from the proportional solenoid 561 acts on the detective core 505 in the direction opposed to that of the force F. Therefore, when the flow of the liquid flowing through the detective core 505 exceeds a set value, the force F acting on the detective core 505 increases with change in momentum of the flowing liquid, resulting in shift of the detective core 505 from the position where its force balances that of the proportional solenoid 561 to a position to the right (in FIG. 8) as against the opposing forces of the proportional solenoid 561 and the second spring 555. Then, the land 539 of the spool 538 opens a passageway between the entry port 532 and the exit port 533 so that the liquid supplied by the pilot line 488 is conveyed to the no-spring end of the discharge control unit 572 by the pilot line 591 having a restrictor 589. As a result, the swash-plate in the variable displacement pump 571 is moved in the direction for decreasing the discharge, thus decreasing the discharge of the variable displacement pump 571. In this manner the discharge of the variable displacement pump 571 is adjusted to a set rate corresponding to the impressed current for exciting the proportional solenoid 561. As a result of the decrease in the flow rate, the force F acting on the detective core 505 decreases with change in the momentum, causing the detective core 505 to resume the position of equilibrium where its force balances the force from the proportional solenoid 561.

Contrarily, when the flow of the liquid flowing through the detective core 505 falls below the set rate, the force which the flow of the liquid causes to act on the detective core 505 decreases. Then, the detective core 505 shifts from the position of equilibrium to a position to the left (in FIG. 8) under an outbalancing force from the proportional solenoid 561. As a result, the land 539 opens a passageway between the exit port 533 and the discharge port 535 so that the liquid in the no-spring end of the discharge control unit 572 is discharged into the tank 592 by the pilot line 591, causing the swash-plate of the variable displacement pump 571 to shift in the direction for increasing the discharge. The discharge rate of the variable displacement pump 571 can thus be increased and resume the set rate. The force F acting on the detective core 505 is increased as the momentum of the flowing liquid increases and consequently the detective core 505 resumes the position of equilibrium where its force balances the force from the proportional solenoid.

By repeating the processes described above, this hydraulic apparatus adjusts the flow of the liquid in the pressure line 585 in terms of mass flow rate to the set rate corresponding to the force which the proportional solenoid 561 is set to exert.

This hydraulic apparatus, being designed to control the discharge of the variable displacement pump 571 by detecting the mass flow rate by the detective core 505, is capable of variably controlling the discharge without being influenced by changes in viscosity of the liquid caused by changes in temperature and adjusting the discharge accurately to a set mass flow rate where cavitation, bubbling, or the like occurs in the flow. In the embodiment described above, the spool 538 has no lap, and the detective core 405 and the spool 538 are joined as one body so that a slight movement of the detective core 505 can actuate the discharge control unit 572 and thus good responsiveness is ensured.

In the embodiment above, a series of passageways comprising a circular groove 511a, bores 511, chamber 515, and outflow passageways 513 are formed in the detective core 505. The object of the present invention, however, can be accomplished where the mass flow rate of a flowing liquid is determined by detecting changes in the momentum which the liquid undergoes as it flows into a control surface including the circumferential surface 505e of the detective core 505 at a certain angle and flows out of it at a certain angle, and accordingly, the present invention does not necessarily require passageways to be formed in the detective core 505 in an embodiment. The detective core can be made in any shape, provided that it is capable of converting a change in momentum of flowing liquid into a force.

In the embodiment above, a sleeve 503 is interposed between the main body structure 502 and the detective core 505 wherein inflow passageways 517, 517, . . . , circular groove 518a and bores 518 for leading out the flowing liquid, and the like are formed. The present invention does not restrict its embodiments to this particular structure but permits the main body structure 502 itself to have the inflow passageways without using a sleeve 503. In the embodiment above, the same value is used for the inflow angle $\theta_1$ and for the outflow angle $\theta_2$ at which the flowing liquid flows into and out of the detective core 505 and the same value for the sectional area $A_1$ of the inflow opening and for that $A_2$ of the outflow opening. Nevertheless, the present invention permits the angle of either the inflow or the outflow to be oblique or to differ between the inflow and the outflow, and also permits the sectional area to differ between the inflow opening and the outflow opening.

In the embodiment above, the land 538a of the spool 538 has no lap. The present invention does not restrict its embodiments to this particular specification but permits the land to show overlap or underlap. The means for setting the mass flow rate is not restricted to a proportional solenoid but a hand lever working with a spring can be substituted in the practice of the present invention.

As will have become understood from the foregoing description, a hydraulic apparatus as an embodiment of the present invention consists primarily of a variable displacement pump having a discharge control unit which is capable of variably controlling the discharge rate under pressure of a liquid, a flow detective unit, and a means for setting the mass flow rate, and operates on a mechanism wherein a change in momentum of a flowing liquid is made to act as a force on the detective core in the flow detective unit, which is counteracted by a force from a means for setting the mass flow rate in such a manner as to actuate a spool joined to said detective core by the opposing forces so that the discharge control unit of the variable displacement pump is actuated to variably control the discharge. The rate of a discharge from the variable displacement pump can thus be variably controlled by detecting the mass flow rate of the liquid. Therefore, a discharge can be controlled accurately without being influenced by changes in viscosity of the liquid caused by changes in its temperature and a discharge can be regulated accurately to a set rate in the manner of variable control where cavitation, bubbling, or the like occurs in the flow. Since, in the practice of the present invention, the discharge from a variable displacement pump is variably controlled on the basis of mass flow detected by the flow detective unit and in quantities actually required in terms of mass flow, this embodiment also lends itself to minimizing the loss of energy.

A flowmeter embodying the present invention operates on a principle that a change in momentum of a flowing liquid is made to act as a force on a detective core so that the mass flow rate of the liquid can be determined by measuring said force acting on the detective core by a means for measuring loads. Not only is this method of measurement free from influences of changes in viscosity of the liquid which may be caused by changes in temperature but is also capable of instantaneously determining the mass flow rate where bubbles, foam, or the like is formed in the flow. The embodiments, therefore, can be advantageously employed in hydraulic systems, measuring systems, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flow control valve comprising a flow detective unit, a flow-regulating unit, and means for setting the flow rate, said flow detective unit comprising a main body structure having an interior, generally cylindrical chamber, a detective core having a longitudinal axis and being slidably fitted in said chamber, a spool which is connected to said detective core and which controls passageways between a plurality of ports in the manner of shifting, inflow passageways formed in said main body structure for leading a flowing fluid into said detective core, and outflow passageways formed in said detective core for leading the fluid drawn in by said inflow passageways into said main body structure, at least either said inflow passageways or said outflow passageways being inclined with respect to the axis of the detective core;

said flow-regulating unit comprising a valve element for opening and shutting the supply passageway leading to said inflow passageway and a chamber opened to one end of said valve element and connected to one of said plurality of ports which is used for pressure control; and said means for setting the flow rate applies a prescribed force to said detective core and actuates said spool by balancing force produced by changes in momentum of a flowing fluid and acting on said detective core.

2. The flow control valve as claimed in claim 1, wherein both said inflow passageways and said outflow passageways are inclined with respect to the axis of the detective core in one direction.

3. The flow control valve as claimed in claim 1, wherein said means for setting the flow rate comprises a proportional solenoid which exerts a force proportional to current applied thereto.

4. A flow control valve comprising a flow detective unit, a flow-regulating unit, and means for setting the mass flow rate, said flow detective unit comprising a main body structure having an interior, generally cylindrical chamber, a detective core having a longitudinal axis and being slidably fitted in said chamber, a spool which is connected to said detective core and which controls the connection between an entry port and an exit port, inflow passageways formed in said main body structure for leading a flowing fluid into said detective core, and outflow passageways formed in said detective core for leading the fluid drawn by said inflow passageways into said main body structure, at least either said inflow passageways or said outflow passageways being inclined with respect to the axis of said detective core;

said flow-regulating unit comprising a valve element for controlling the flow rate of the fluid whose flow rate is detected by said flow detective unit and a pilot chamber opened to one end of said valve element;

said means for setting the mass flow rate comprising a mechanism for adjusting the flow rate which applies a set force to said detective core and actuates said spool by balancing force produced by changes in momentum of a flowing fluid and acting on said detective core; and a pilot line having a restrictor connecting the pilot chamber of said flow regulating unit to said exit port, a line connecting the chamber opened to one end of said detective core to a point in a line between said restrictor and said exit port, a line connecting the chamber opened to the other end of said detective core to a pilot chamber of said flow-regulating unit, and a line connecting the chamber opened to one end of the spool in the flow detective unit to said pilot line.

5. The flow control valve as claimed in claim 4, wherein both said inflow passageways and said outflow passageways are inclined with respect to the axis of the detective core in one direction.

6. The flow control valve as claimed in claim 4, wherein a restrictor is provided for said line which connects the chamber opened to the other end of said detective core to said pilot chamber of said flow-regulating unit.

* * * * *